(12) United States Patent
Miyashita et al.

(10) Patent No.: US 10,887,134 B2
(45) Date of Patent: Jan. 5, 2021

(54) CIRCUIT DEVICE, ELECTRO-OPTICAL DEVICE, AND ELECTRONIC APPARATUS

(71) Applicant: SEIKO EPSON CORPORATION, Tokyo (JP)

(72) Inventors: Yoshihito Miyashita, Hokuto (JP); Akira Morita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/697,321

(22) Filed: Nov. 27, 2019

(65) Prior Publication Data

US 2020/0169437 A1 May 28, 2020

(30) Foreign Application Priority Data

Nov. 28, 2018 (JP) ................. 2018-221894

(51) Int. Cl.
*H04L 25/08* (2006.01)
*G06F 1/10* (2006.01)

(52) U.S. Cl.
CPC ............ *H04L 25/085* (2013.01); *G06F 1/105* (2013.01)

(58) Field of Classification Search
None
See application file for complete search history.

(56) References Cited

U.S. PATENT DOCUMENTS

| 9,667,239 B2* | 5/2017 | Nomiyama | ............ H03K 19/20 |
| 2006/0109044 A1* | 5/2006 | Lee | ......... G11C 7/222 |
| | | | 327/291 |
| 2009/0237174 A1 | 9/2009 | Morita | |
| 2010/0127744 A1 | 5/2010 | Matsubara | |
| 2019/0068417 A1* | 2/2019 | Rehman | .................. H04L 27/06 |

FOREIGN PATENT DOCUMENTS

| JP | 2009-225406 A | 10/2009 |
| JP | 2010-130293 A | 6/2010 |
| JP | 2015-166755 A | 9/2015 |

* cited by examiner

*Primary Examiner* — Lincoln D Donovan
*Assistant Examiner* — Khareem E Almo
(74) *Attorney, Agent, or Firm* — Oliff PLC

(57) ABSTRACT

A circuit device includes a first terminal, a second terminal, a receiving circuit configured to receive the differential signals via the first terminal and the second terminal, a first signal line connecting a first input terminal of the receiving circuit and the first terminal, a second signal line connecting a second input terminal of the receiving circuit and the second terminal, a first capacitor circuit having one end connected to the first signal line, a second capacitor circuit having one end connected to the second signal line, and a detection circuit configured to detect a duty cycle of an output signal that is output from the receiving circuit.

17 Claims, 13 Drawing Sheets

CIRCUIT DEVICE, ELECTRO-OPTICAL DEVICE, AND ELECTRONIC APPARATUS

The present application is based on and claims priority from JP Application Serial Number 2018-221894, filed Nov. 28, 2018, the disclosure of which is hereby incorporated by reference herein in its entirety.

BACKGROUND

1. Technical Field

The present disclosure relates to a circuit device, an electro-optical device, and an electronic apparatus.

2. Related Art

High-speed serial transfer, such as Low Voltage Differential Signaling (LVDS), is known that serves as an interface capable of achieving high-speed communications between circuit devices. In the high-speed serial transfer, a transmission circuit transmits serialized data with differential signals, while a receiving circuit differentially amplifies the differential signals, thereby achieving data transfer. As such a known technique for high-speed serial transfer, a technique is disclosed in JP-A-2009-225406, for example.

In the high-speed serial transfer as described above, there is a problem in that a cross point of the differential signals is displaced as the transfer rate increases. When the cross point is displaced, since a data determination time for received data fluctuates, it becomes difficult to ensure set up and hold times when capturing received data using clock signals. As a factor in the displacement of the cross point, it is conceivable that capacities of a positive electrode and a negative electrode are unbalanced in a receiving circuit, for example, or parasitic loads of the positive electrode and the negative electrode are unbalanced in a transmission line.

SUMMARY

A first aspect of the present disclosure relates to a circuit device including a first terminal into which a first signal of a differential signal is input, a second terminal into which a second signal of the differential signal is input, a receiving circuit configured to receive the differential signals via the first terminal and the second terminal, a first signal line connecting a first input terminal of the receiving circuit and the first terminal, a second signal line connecting a second input terminal of the receiving circuit and the second terminal, a first capacitor circuit having one end connected to the first signal line and another end connected to a node with a predetermined potential, a second capacitor circuit having one end connected to the second signal line and another end connected to the node with the predetermined potential, and a detection circuit configured to detect a duty cycle of an output signal that is output from the receiving circuit. A first capacitance value, which is a capacitance value of the first capacitor circuit, is set to a capacitance value that is based on a detection result of the detection circuit.

DESCRIPTION OF EXEMPLARY EMBODIMENTS

Exemplary embodiments of the present disclosure will be described in detail hereinafter. Note that the embodiments described hereinafter are not intended to unjustly limit the content of the present disclosure as set forth in the claims, and all of the configurations described in the embodiments are not always required to solve the issues described in the present disclosure.

1. First Configuration Example of Circuit Device.

Figure 1:
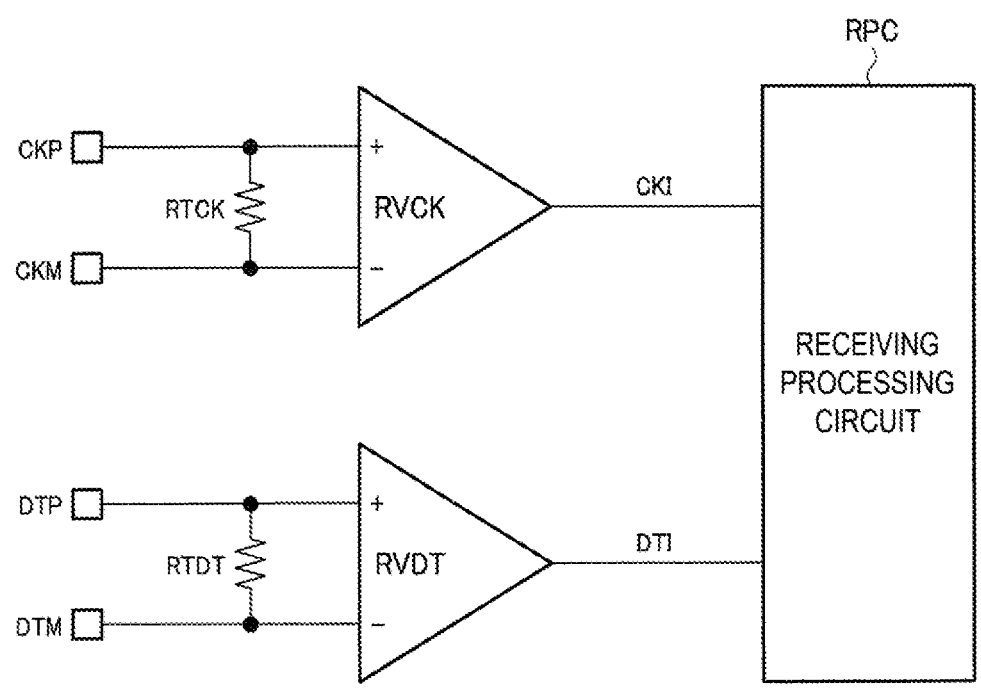
FIG. 1 is a circuit device of a comparative example.

First, with reference to FIG. 1 and FIG. 2, a description will be made of the fact that a data determination time fluctuates due to a displacement in a cross point of differential signals. FIG. 1 is a circuit device of a comparative example, and FIG. 2 is a waveform diagram illustrating an operation of the comparative example.

As illustrated in FIG. 1, differential signals CKP and CKM are current-voltage converted by a termination resistor RICK. A receiving circuit RVCK outputs a single-ended clock signal CKI by receiving the voltage-converted differential signals CKP and CKM. Differential signals DTP and DTM are current-voltage converted by a termination resistor RTDT. A receiving circuit RVDT outputs a single-ended data signal DTI by receiving the voltage-converted differential signals DTP and DTM. A receiving processing circuit RPC uses the clock signal CKI to capture the data signal DTI. For example, the receiving processing circuit RPC performs serial parallel conversion on the data signal DTI using the clock signal CKI.

Figure 2:
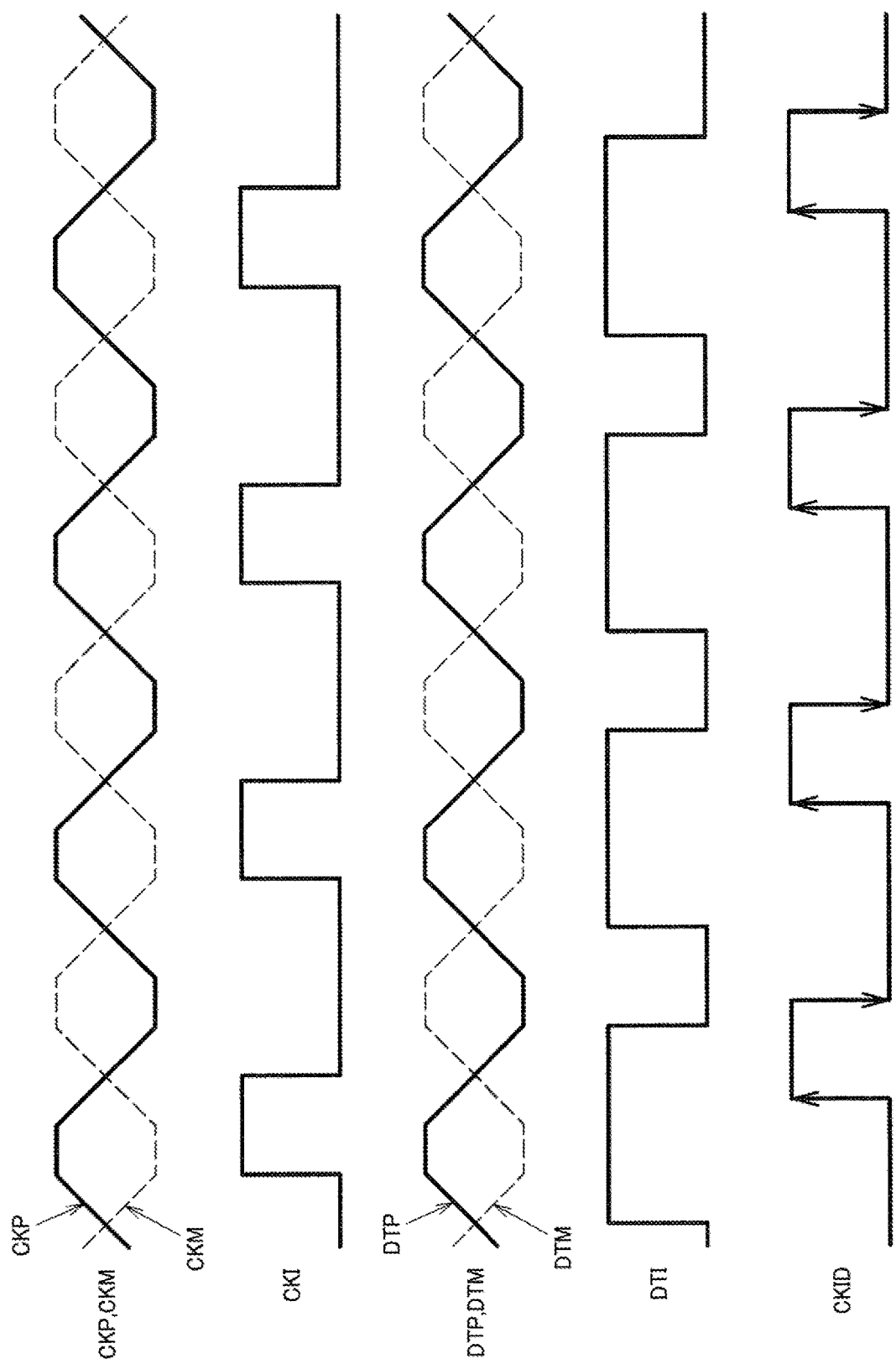
FIG. 2 is a waveform diagram illustrating an operation of the comparative example.

As illustrated in FIG. 2, it is assumed that the differential signals CKP and CKM input to the receiving circuit RVCK are in a state in which a cross point is not displaced. The cross point is a point at which the positive electrode signal CKP and the negative electrode signal CKM intersect. In other words, the cross point is the voltage and timing at which CKP and CKM intersect. In FIG. 2, the voltage at the cross point is the center of the amplitude and the timings of the cross points are at equal intervals.

In the receiving circuit RVCK, when there is an imbalance between a capacity to change the clock signal CKI from a low level to a high level and a capacity to change the clock signal CKI from the high level to the low level, the duty cycle of the clock signal CKI is displaced from 50% even if the cross point of the differential signals CKP and CKM is not displaced. FIG. 2 illustrates an example in which the high duty cycle of the clock signal CKI is less than 50%. In actuality, this is the same as when the cross point of the differential signals CKP and CKM is displaced. Similarly, the duty cycle of the data signal DTI is displaced from 50%. FIG. 2 illustrates an example in which the low duty cycle of the data signal DTI is less than 50%.

The receiving processing circuit RPC generates a clock signal CKID for capturing the data signal DTI based on the clock signal CKI. Then, the receiving processing circuit RPC captures the data signal DTI at the rising edge of the clock signal CKID and at the rising edge. If there are fluctuations in the duty cycle as described above, the data determination time of the data signal DTI will fluctuate. In the example illustrated in FIG. 2, a time period over which the data signal DTI is at a low level is short. With such fluctuations in the data determination time, it is difficult for the receiving processing circuit RPC to secure set up and hold times when capturing the data signal DTI using the clock signal CKID. In the example illustrated in FIG. 2, the setup time when capturing the data signal DTI at the falling edge of the clock signal CKID is shortened. Since the duty cycle of the clock signal CKI and the data signal DTI varies due to process fluctuations, it becomes difficult to secure margins for the set up and hold times. The more the transfer rate increases, the more it is difficult to secure the margins for the set up and hold times, and the above-described fluctuations in the duty cycle are an issue when improving the transfer rate.

Note that, in the above description, an example has been described in which the data determination time fluctuates due to an imbalance between the capacity of the positive electrode and the negative electrode in the receiving circuit, but factors causing the data determination time to fluctuate are not limited to this example. For example, the data determination time also fluctuates due to an imbalance between a parasitic load of the positive electrode and the negative electrode in the transmission line of the differential signals, or due to an imbalance between a drive capability of the positive electrode and the negative electrode in the transmission circuit, and the like. In the following embodiment, an example is given of a case in which the data determination time fluctuates due to the imbalance between the capacity of the positive electrode and the negative electrode in the receiving circuit, but the present embodiment can also be applied to cases in which the data determination time fluctuates depending on other factors, such as those described above.

Figure 3:
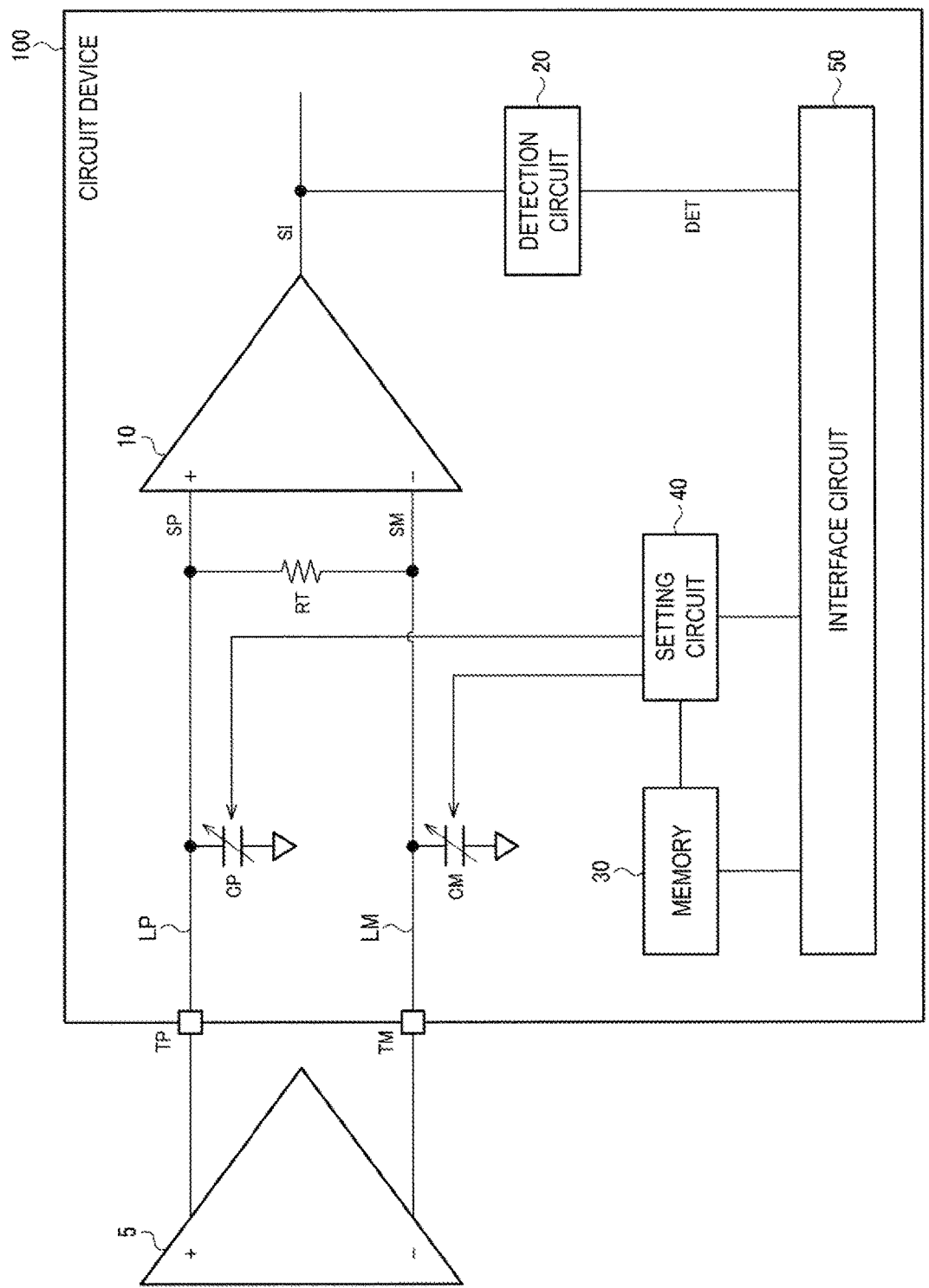
FIG. 3 is a first configuration example of a circuit device.

A circuit device of the present embodiment will now be described. FIG. 3 is a first configuration example of a circuit device 100. The circuit device 100 includes a receiving circuit 10, a detection circuit 20, a memory 30, a setting circuit 40, an interface circuit 50, terminals TP and TM, signal lines LP and LM, capacitor circuits CP and CM, and a termination resistor RT. The circuit device 100 is, for example, an integrated circuit device.

A transmission circuit 5 provided outside the circuit device 100 outputs differential signals to the terminals TP and TM. The differential signals include signals SP and SM. The signal SP is input to the terminal TP, and the signal SM is input to the terminal TM. The transmission circuit 5 is, for example, a current driver circuit. In this case, the current differential signals are converted to the voltage differential signals by the termination resistor RT. The signals SP and SM are the differential signals after being voltage-converted.

The signal line LP connects a positive input terminal of the receiving circuit 10 and the terminal TP. The signal line LM connects a negative input terminal of the receiving circuit 10 and the terminal TM. Note that the connection according to the present embodiment is an electrical connection. The electrical connection refers to being connected such that electrical signals are transmissible. A connection that allows transmission of information using electrical signals is an electrical connection, and may be a connection via a passive element or the like. For example, a resistor or capacitor, or the like may be inserted into the path of the signal lines LP and LM, for example.

The receiving circuit 10 receives the differential signals input to a non-inverting input terminal and an inverting input terminal. The receiving circuit 10 outputs the received differential signals as a single-ended output signal SI. Configuration examples of the receiving circuit 10 will be described later. Note that a case in which the output signal SI is the same polarity as the signal SP that is the positive electrode signal of the differential signals will be described as an example, but the output signal SI may be the same polarity as the signal SM that is the negative electrode signal of the differential signals.

One end of the capacitor circuit CP is connected to the signal line LP, and the other end of the capacitor circuit CP is connected to a ground node. One end of the capacitor circuit CM is connected to the signal line LM, and the other end of the capacitor circuit CM is connected to a ground node. Note that the other ends of the capacitor circuits CP and CM may be connected to a node with a predetermined potential rather than the ground node.

The capacitor circuit CP is a variable capacitor circuit. Specifically, the capacitor circuit CP includes first to p-th switches and first to p-th capacitors. p is an integer equal to or greater than 2. The i-th switch and the i-th capacitor are connected in series between the signal line LP and the ground node. i is an integer equal to or greater than 1 and equal to or less than p. The switch is, for example, a transistor. The setting circuit 40 sets each switch of the first to the p-th switches on or off. As a result, a capacitance value of the capacitor circuit CP is set to be variable. Similarly, the capacitor circuit CM is a variable capacitor circuit, and has the same configuration as the capacitor circuit CP.

The detection circuit 20 detects a duty cycle of the output signal SI, and outputs the detection result as a detection signal DET. Hereinafter, a case in which the detection circuit 20 detects the high duty cycle of the output signal SI will be described as an example. The capacitance value of the capacitor circuit CP is set to a capacitance value based on the detection result of the detection circuit 20. In the first configuration example, when manufacturing the circuit device 100, the detection circuit 20 detects the duty cycle of the output signal SI, and the capacitance value based on the detection result is set in advance. Similarly, the capacitance value of the capacitor circuit CM is set to a capacitance value based on the detection result of the detection circuit 20.

When the capacitance values of the capacitor circuits CP and CM are changed, the cross point of the differential signals changes, and thus the duty cycle of the output signal SI output from the receiving circuit 10 changes. That is, according to the present embodiment, by setting the capacitance values of the capacitor circuits CP and CM based on the detection results of the duty cycle, it is possible to reduce the displacement of the duty cycle. The displacement of the duty cycle is the displacement relative to a reference duty cycle. The reference duty cycle is, for example, 50%. In the present embodiment, the cross point of the differential signals can be adjusted so that the duty cycle of the output signal SI is 50%. Note that it is sufficient that the cross point be adjusted so that the duty cycle is approximately 50%. That is, it is sufficient that the duty cycle be improved to the extent that the setup and hold times can be secured, and the duty cycle does not need to be precisely 50%.

Figure 4:
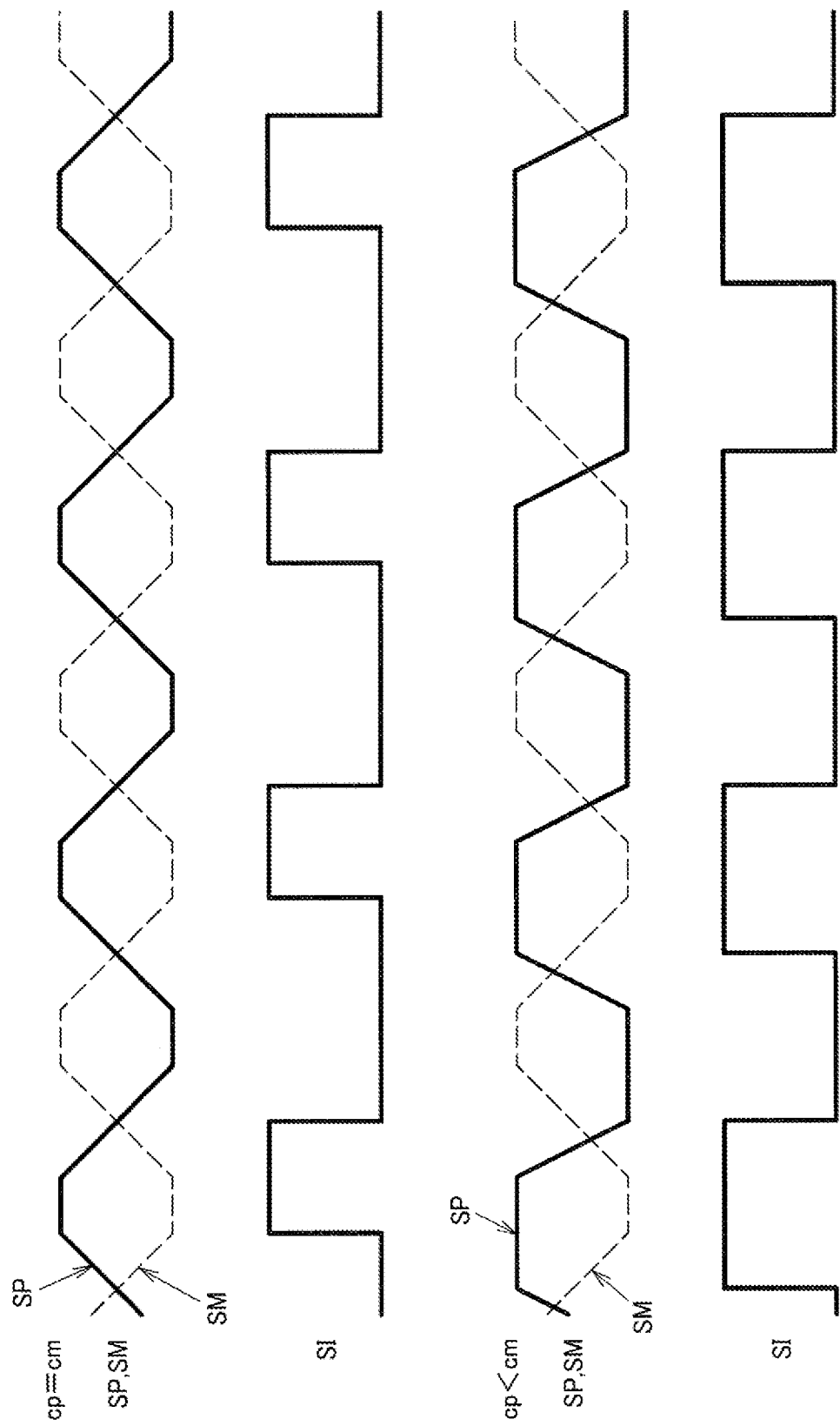
FIG. 4 is a waveform diagram illustrating an operation of the first configuration example.

As illustrated in FIG. 4, when cp=cm, the duty cycle<50%. The cp is the capacitance value of the capacitor circuit CP and cm is the capacitance value of the capacitor circuit CM. In this case, cp and cm are set to be cp<cm. For example, when cp=cm, then cp=cm=c0. In this case, cp and cm are set to be cp<c0<cm. As illustrated in FIG. 4, by causing the setting to be cp<cm, a voltage change of the signal SP becomes steeper than a voltage change of the signal SM. In this way, the cross point of the differential signals changes so that the duty cycle of the output signal SI increases. On the other hand, when cp=cm, the duty cycle>50%. In this case, cp and cm are set to be cp>cm. In this way, the cross point of the differential signals changes so that the duty cycle of the output signal SI decreases. In this way, the cross point of the differential signals is adjusted so that the duty cycle of the output signal SI is 50%.

The memory 30 stores setting information for setting the capacitance values of the capacitor circuits CP and CM. The setting information is, for example, data for setting the first to p-th switches described above to on or off. The memory 30 is a nonvolatile memory. The nonvolatile memory is, for example an Electrically Erasable Programmable Read-Only Memory (EEPROM), or a flash memory or the like. The EEPROM can be realized by, for example, a floating gate type memory cell or the like. The flash memory may be realized, for example, by a Metal-Oxide-Nitride-Oxide-Silicon (MONOS) memory cell or the like. Alternatively, the nonvolatile memory may be a memory using a fuse cell. The fuse cell includes a programmable resistance with a variable resistance value corresponding to a stored bit signal.

The setting information is written into the memory 30 during the manufacturing of the circuit device 100. Specifically, the detection circuit 20 detects whether or not the duty cycle of the output signal SI is higher than 50%. The interface circuit 50 transmits the detection signal DET to an external device. The external device is, for example, a tester that inspects the circuit device 100. The external device outputs the setting information for the capacitance values cp and cm to the interface circuit 50 based on the detection signal DET. The interface circuit 50 outputs the setting information to the setting circuit 40. For example, when the duty cycle<50%, the external device decreases cp while increasing cm, and acquires cp and cm when the duty cycle reaches 50%. The external device writes the setting information for cp and cm into the memory 30 via the interface circuit 50.

The operation of the circuit device 100 incorporated into an electronic apparatus or the like is referred to as a normal operation. In normal operation, the setting circuit 40 reads the setting information for cp and cm from the memory 30, and sets the capacitance values of the capacitor circuits CP and CM based on the setting information. This results in the duty cycle of the output signal SI being 50% in normal operation. In the first configuration example, the setting circuit 40 is a register, for example. In this case, the setting information for cp and cm is read out into the register from the memory 30. By outputting the held setting information to the capacitor circuits CP and CM, the register sets the capacitance values of the capacitor circuits CP and CM.

Note that the detection circuit 20 may detect whether or not the duty cycle of the output signal SI is within a predetermined range. The predetermined range is a range including 50% and is, for example, (50−α)% or greater to (50+α)% or less. α is set based on a simulation or the like so that set up and hold times during data acquisition can be secured. For example, when the duty cycle<(50−α)%, the external device decreases cp while increasing cm, and acquires cp and cm when the duty cycle is within the predetermined range. The external device writes the setting information for cp and cm into the memory 30 via the interface circuit 50.

In the above, a case is described in which both the capacitance values of the capacitor circuits CP and CM are set to be variable, but only the capacitance value of the capacitor circuit CP may be set to be variable. In this case, the capacitor circuit CM may be a capacitor having a fixed capacitance value. Alternatively, only the capacitance value of the capacitor circuit CM may be set to be variable. In this case, the capacitor circuit CP may be a capacitor having a fixed capacitance value.

Note that in the first configuration example, SP, TP, LP, CP, and the positive input terminal of the receiving circuit 10 are, respectively, a first signal, a first terminal, a first signal line, a first capacitor circuit, and a first input terminal, and SM, TM, LM, CM, and the negative input terminal of the receiving circuit 10 are, respectively, the second signal, a second terminal, a second signal line, a second capacitor circuit, and a second input terminal. Alternatively, SM, TM, LM, CM, and the negative input terminal of the receiving circuit 10 may be, respectively, the first signal, the first terminal, the first signal line, the first capacitor circuit, and the first input terminal, and SP, TP, LP, CP, and the positive input terminal of the receiving circuit 10 may be, respectively, the second signal, the second terminal, the second signal line, the second capacitor circuit, and the second input terminal.

2. Second Configuration Example of Circuit Device.

Figure 5:
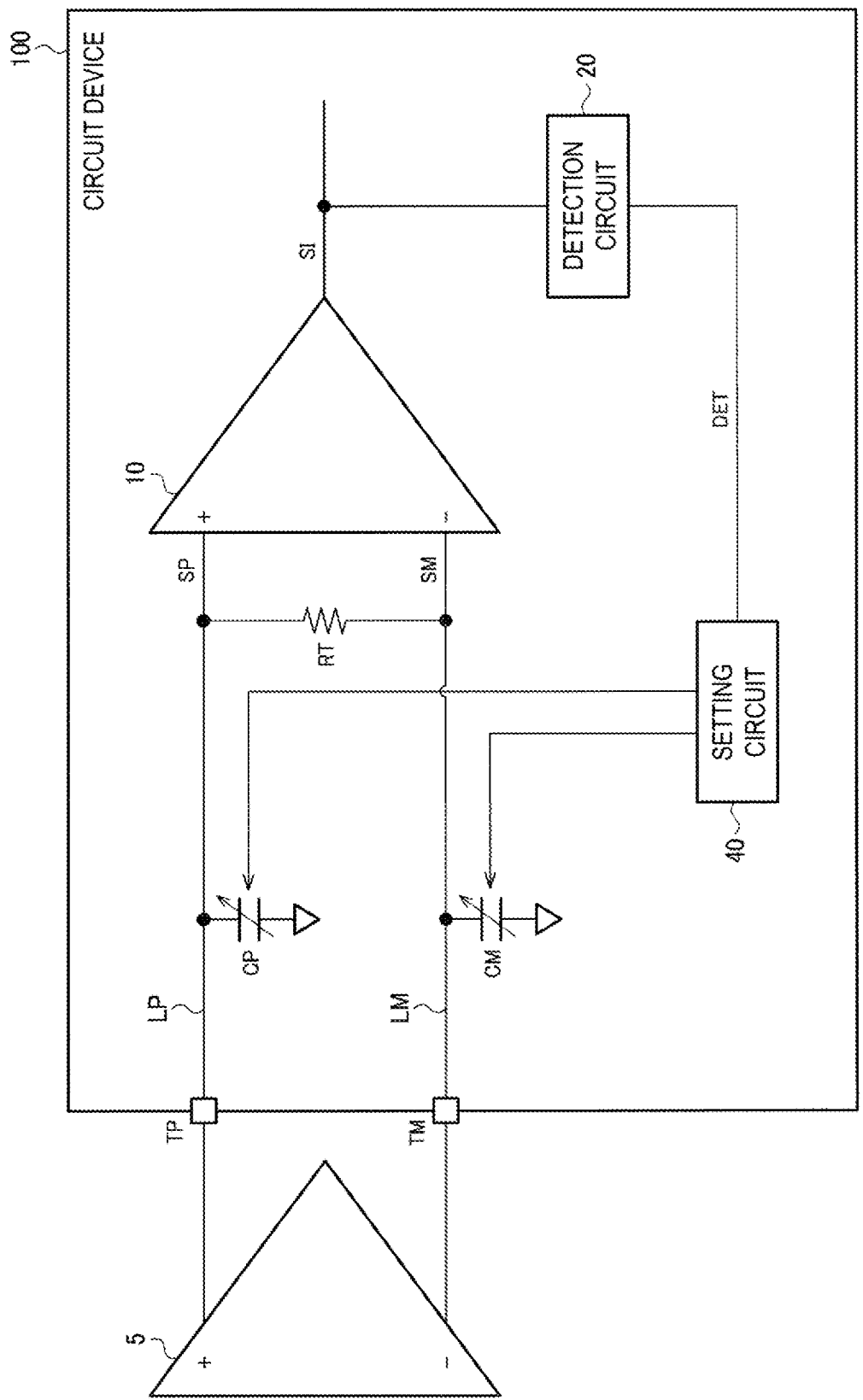
FIG. 5 is a second configuration example of the circuit device.

FIG. 5 is a second configuration example of the circuit device 100. The circuit device 100 includes the receiving circuit 10, the detection circuit 20, the setting circuit 40, the terminals TP and TM, the signal lines LP and LM, the capacitor circuits CP and CM, and the termination resistor RT. Note that the same components as the components already described are assigned the same reference numerals, and a description of the components will be omitted as appropriate.

In the second configuration example, in normal operation, the capacitance values of the capacitor circuits CP and CM are set by the setting circuit 40 based on the detection result of the detection circuit 20. In the second configuration example, the setting circuit 40 is a logic circuit in which logic elements are combined.

Specifically, the detection circuit 20 detects whether or not the duty cycle of the output signal SI output from the receiving circuit 10 is higher than 50%. When the duty cycle<50%, the setting circuit 40 decreases the capacitance value cp of the capacitor circuit CP while increasing the capacitance value cm of the capacitor circuit CM. On the other hand, when the duty cycle>50%, the setting circuit 40 increases cp while decreasing cm. This results in the duty cycle of the output signal SI being 50%.

Alternatively, the detection circuit 20 detects whether or not the duty cycle of the output signal SI is within a predetermined range. The predetermined range is, for example, (50−α)% or greater to (50+α)% or less. When the duty cycle<(50−α)%, the setting circuit 40 decreases cp while increasing cm. When the duty cycle>(50+α)%, the setting circuit 40 increases cp while decreasing cm. When (50−α)%<duty cycle>(50+α)%, the setting circuit 40 does not change cp and cm. As a result, the duty cycle of the output signal SI is within the predetermined range.

Figure 14:
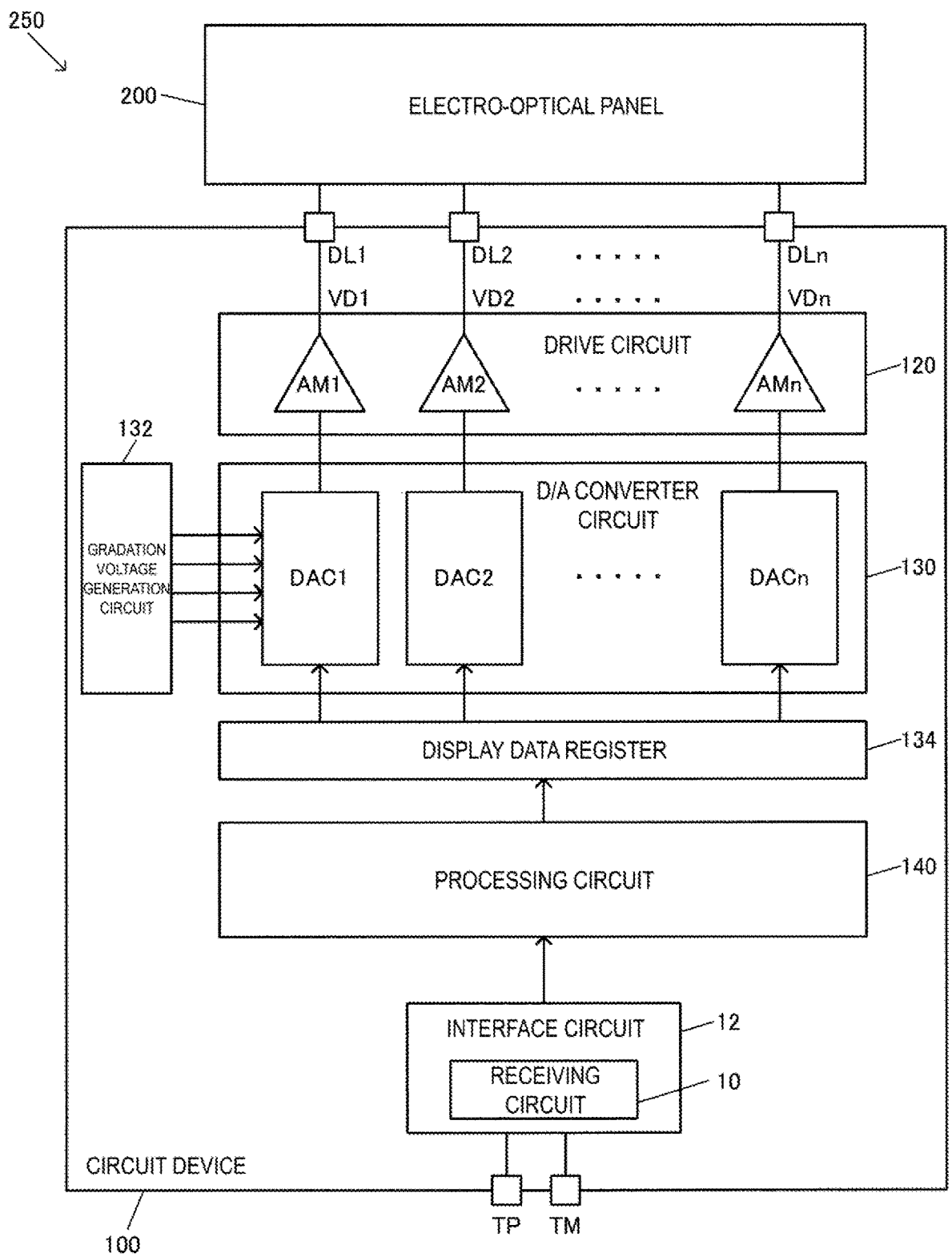
FIG. 14 is a configuration example of an electro-optical device.

As to be described below with reference to FIG. 14, the circuit device 100 is a display driver configured to drive an electro-optical panel, for example. The receiving circuit 10 is a receiving circuit for receiving display data or display control signals. The display control signals are pixel clock signals or vertical synchronization signals, horizontal synchronization signals, data enable signals, and the like. At this time, the setting circuit 40 controls the capacitance values of the capacitor circuits CP and CM in at least one of a vertical blanking period and a horizontal blanking period during display data transfer. The blanking period is a period during which the display data transfer is disabled, namely, a period in which no display data is input to the receiving circuit 10. The vertical blanking period is a period until a period starts in which a next one frame of display data is transferred after a period ends in which one frame of display data is transferred. The horizontal blanking period is a period until a period starts in which a next one line of display data is transferred, after a period ends in which one line of display data is transferred.

Note that the example is not limited to that described above, and the capacitance values of the capacitor circuits CP and CM may be controlled by the setting circuit 40 during the period in which the display data is not input to the receiving circuit 10. For example, the setting circuit 40 may control the capacitance values of the capacitor circuits CP and CM during an initialization period after the circuit device 100 is activated.

Furthermore, the setting circuit 40 is not limited to a case in which both the capacitance values of the capacitor circuits CP and CM are controlled. That is, the setting circuit 40 may control only the capacitance value of the capacitor circuit CP. In this case, the capacitor circuit CM may be a capacitor having a fixed capacitance value. Alternatively, the setting circuit 40 may control only the capacitance value of the capacitor circuit CM. In this case, the capacitor circuit CP may be a capacitor having a fixed capacitance value.

3. Third Configuration Example of Circuit Device.

Figure 6:
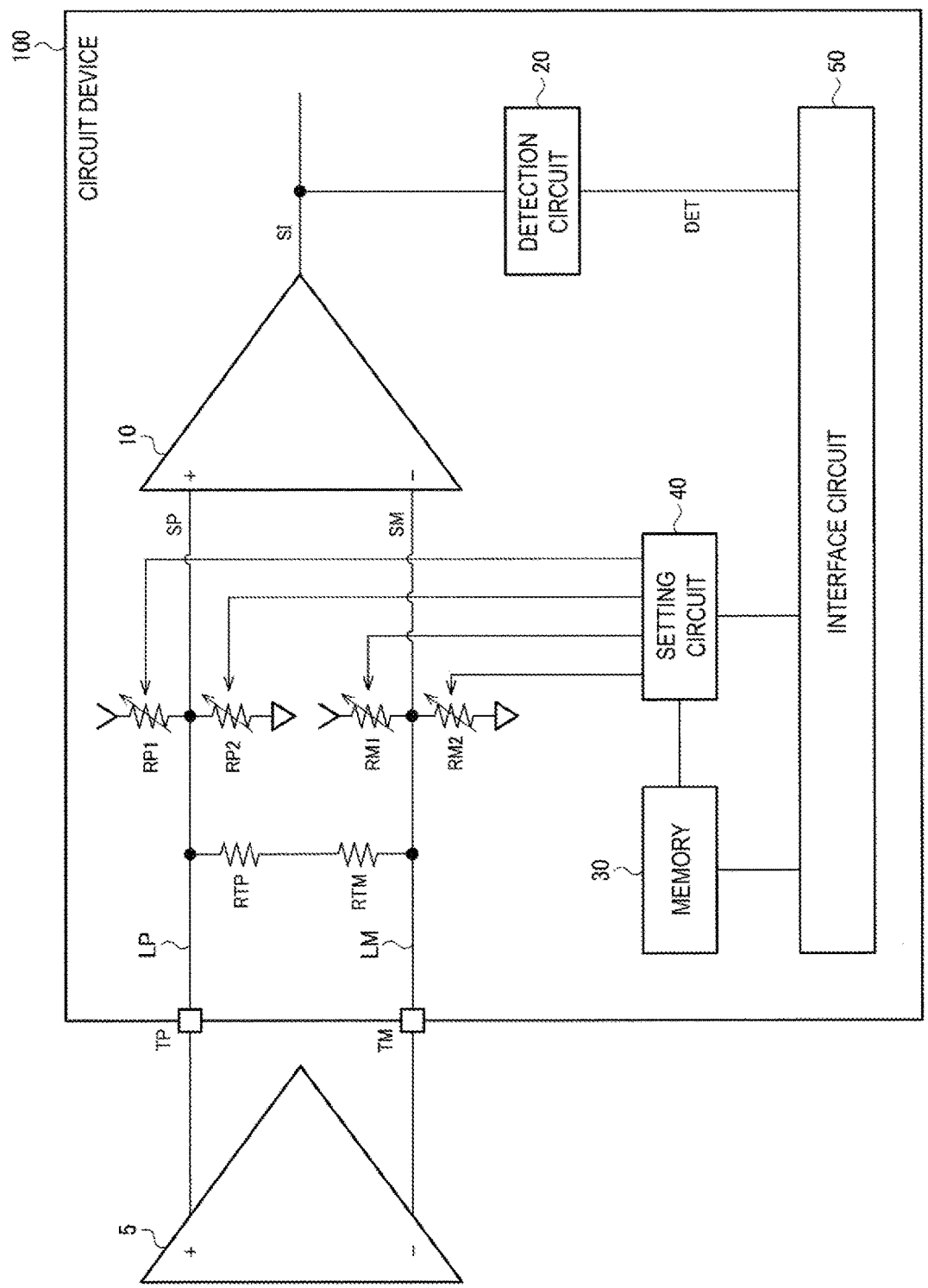
FIG. 6 is a third configuration example of the circuit device.

FIG. 6 is a third configuration example of the circuit device 100. The circuit device 100 includes the receiving circuit 10, the detection circuit 20, the memory 30, the setting circuit 40, the interface circuit 50, the terminals TP and TM, the signal lines LP and LM, resistance circuits RP1, RP2, RM1, and RM2, and termination resistors RTP and RTM. Note that the same components as the components already described are assigned the same reference numerals, and a description of the components will be omitted as appropriate.

The termination resistors RTP and RTM are connected in series between the signal lines LP and LM. Similarly to the first configuration example, the signal line LP electrically connects the positive input terminal of the receiving circuit 10 and the terminal TP, and the signal line LM electrically connects the negative input terminal of the receiving circuit 10 and the terminal TM. For example, a capacitor for AC coupling may be inserted into each of the signal lines LP and LM. In that case, a bias voltage is supplied to a node to which the termination resistors RTP and RTM are connected.

One end of the resistance circuit RP1 is connected to the signal line LP, and the other end of the resistance circuit RP1 is connected to a power source node. One end of the resistance circuit RP2 is connected to the signal line LP, and the other end of the resistance circuit RP2 is connected to a ground node. One end of the resistance circuit RM1 is connected to the signal line LM, and the other end of the resistance circuit RM1 is connected to the power source node. One end of the resistance circuit RM2 is connected to the signal line LM, and the other end of the resistance circuit RM2 is connected to the ground node. Note that the other ends of the resistance circuits RP1 and RM1 are not limited to being connected to the power source node, and may be connected to a node with a first potential. Furthermore, the other ends of the resistance circuits RP2 and RM2 are not limited to being connected to the ground node, and may be connected to a node with a second potential. The second potential is lower than the first potential.

The resistance circuit RP1 is a variable resistance circuit. Specifically, the resistance circuit RP1 includes first to q-th switches, and first to q-th resistors. q is an integer equal to or greater than 2. A j-th switch and a j-th capacitor are connected in series between the signal line LP and the power source node. j is an integer equal to or greater than 1 and equal to or less than q. The switch is, for example, a transistor. The setting circuit 40 sets each switch of the first to q-th switches on or off. As a result, the resistance value of the resistance circuit RP1 is set to be variable. Similarly, the resistance circuits RP2, RM1, and RM2 are variable capacitor circuits and have a similar configuration to the resistance circuit RP1.

When the resistance values of the resistance circuits RP1, RP2, RM1, and RM2 are changed, the cross point of the differential signals changes, and thus the duty cycle of the output signal SI output from the receiving circuit 10 changes. In the third configuration example, the resistance values of the resistance circuits RP1, RP2, RM1, and RM2 are set to resistance values based on the detection result of the detection circuit 20. In other words, the resistance values of the resistance circuits RP1, RP2, RM1, and RM2 are set based on the detection result of the duty cycle. This allows the cross point of the differential signals to be adjusted so that the duty cycle of the output signal SI is 50%.

Figure 7:
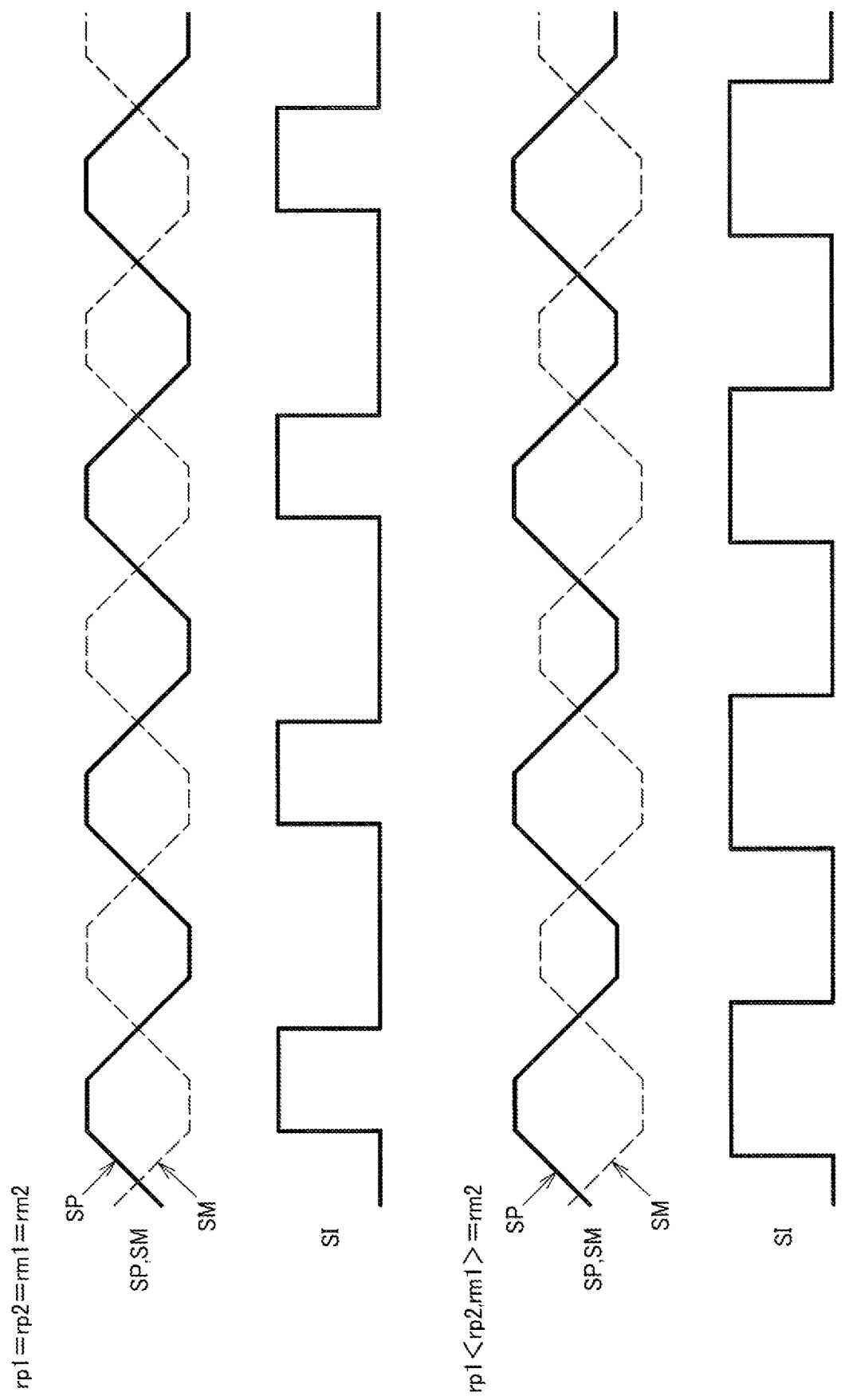
FIG. 7 is a waveform diagram illustrating an operation of the third configuration example.

As illustrated in FIG. 7, when rp1=rp2=rm1=rm2, the duty cycle<50%. The rp1 is the resistance value of the resistance circuit RP1, rp2 is the resistance value of the resistance circuit RP2, rm1 is the resistance value of the resistance circuit RM1, and rm2 is the resistance value of the resistance circuit RM2. In this case, rp1, rp2, rm1, and rm2 are set to be rp1<rp2 and rm1>rm2. For example, when rp1=rp2=rm1=rm2, then rp1=rp2=rm1=rm2=r0. In this case, settings are made such that rp1<r0<rp2 and rm1>r0>rm2. As illustrated in FIG. 7, by setting rp1<rp2 and rm1>rm2, the amplitude center of the signal SP is higher than the amplitude center of the signal SM. In this way, the cross point of the differential signals changes so that the duty cycle of the output signal SI increases. On the other hand, when rp1=rp2=rm1=rm2, the duty cycle>50%. In this case, rp1, rp2, rm1, and rm2 are set such that rp1>rp2 and rm1<rm2. In this way, the cross point of the differential signals changes so that the duty cycle of the output signal SI decreases. In this way, the cross point of the differential signals is adjusted so that the duty cycle of the output signal SI is 50%.

The memory 30 stores setting information for setting the resistance values of the resistance circuits RP1, RP2, RM1, and RM2. The setting information is, for example, data for setting the first to q-th switches described above to on or off. The memory 30 is a nonvolatile memory.

The setting information is written into the memory 30 during the manufacturing of the circuit device 100. Specifically, the detection circuit 20 detects whether or not the duty cycle of the output signal SI is higher than 50%. The interface circuit 50 transmits the detection signal DET to an external device. The external device outputs the setting information for the resistance values rp1, rp2, rm1, and rm2 based on the detection signal DET to the interface circuit 50. The interface circuit 50 outputs the setting information to the setting circuit 40. For example, when the duty cycle<50%, the external device decreases rp1 and rm2 while increasing rp2 and rm1, and acquires rp1, rp2, rm1, and rm2 when the duty cycle reaches 50%. The external device writes the setting information for rp1, rp2, rm1, and rm2 into the memory 30 via the interface circuit 50.

In normal operation, the setting circuit 40 reads out the setting information for rp1, rp2, rm1, and rm2 from the memory 30 and sets the resistance values of the resistance circuits RP1, RP2, RM1, and RM2 based on the setting information. This results in the duty cycle of the output signal SI being 50% in normal operation.

Note that the detection circuit 20 may detect whether or not the duty cycle of the output signal SI is within a predetermined range. The predetermined range is, for example, $(50-\alpha)\%$ or greater to $(50+\alpha)\%$ or less. For example, when the duty cycle<$(50-\alpha)\%$, the external device decreases rp1 and rm2 while increasing rp2 and rm1, and acquires rp1, rp2, rm1, and rm2 when the duty cycle is within the predetermined range. The external device writes the setting information for rp1, rp2, rm1, and rm2 into the memory 30 via the interface circuit 50.

In the above description, a case in which the memory 30 stores the setting information for the resistance values has been described as an example, but in the same manner as in the second configuration example, the setting circuit 40 may control the resistance values of the resistance circuits RP1, RP2, RM1, and RM2 based on the detection results of the detection circuit 20. In this case, the memory 30 and the interface circuit 50 may be omitted.

Specifically, the detection circuit 20 detects whether or not the duty cycle of the output signal SI output from the receiving circuit 10 is higher than 50%. When the duty cycle<50%, the setting circuit 40 decreases rp1 and rm2 while increasing rp2 and rm1. On the other hand, when the duty cycle>50%, the setting circuit 40 increases rp1 and rm2 while decreasing rp2 and rm1. This results in the duty cycle of the output signal SI being 50%.

Alternatively, the detection circuit 20 detects whether or not the duty cycle of the output signal SI is within a predetermined range. The predetermined range is, for example, $(50-\alpha)\%$ or greater to $(50+\alpha)\%$ or less. When the duty cycle<$(50-\alpha)\%$, the setting circuit 40 decreases rp1 and rm2 while increasing rp2 and rm1. When the duty cycle>$(50+\alpha)\%$, the setting circuit 40 increases rp1 and rm2 while decreasing rp2 and rm1. When $(50-\alpha)\%$<duty cycle<$(50+\alpha)\%$, the setting circuit 40 does not change rp1, rp2, rm1, and rm2. As a result, the duty cycle of the output signal SI is within the predetermined range.

Furthermore, in the above description, an example has been described of a case in which the resistance values of the resistance circuits RP1, RP2, RM1, and RM2 are set to be variable, but only the resistance values of the resistance circuits RP1 and RP2 may be set to be variable. In this case, the resistance circuits RM1 and RM2 may be resistive elements with fixed resistance values. Alternatively, only the resistance values of the resistance circuits RM1 and RM2 may be set to be variable. In this case, the resistance circuits RP1 and RP2 may be resistors with fixed resistance values.

Note that, in the third configuration example, SP, TP, LP, RP1, RP2, and the positive input terminal of the receiving circuit 10 are, respectively, the first signal, the first terminal, the first signal line, a first resistance circuit, a second resistance circuit, and the first input terminal, and SM, TM, LM, RM1, RM2, and the negative input terminal of the receiving circuit 10 are, respectively, the second signal, the second terminal, the second signal line, a third resistance circuit, a fourth resistance circuit, and the second input terminal. Alternatively, SM, TM, LM, RM1, RM2, and the negative input terminal of the receiving circuit 10 may be, respectively, the first signal, the first terminal, the first signal line, the first resistance circuit, the second resistance circuit, and the first input terminal, and SP, TP, LP, RP1, RP2, and the positive input terminal of the the receiving circuit 10 may be, respectively, the second signal, the second terminal, the second signal line, the third resistance circuit, the fourth resistance circuit, and the second input terminal.

4. Detection Circuit

Figure 8:
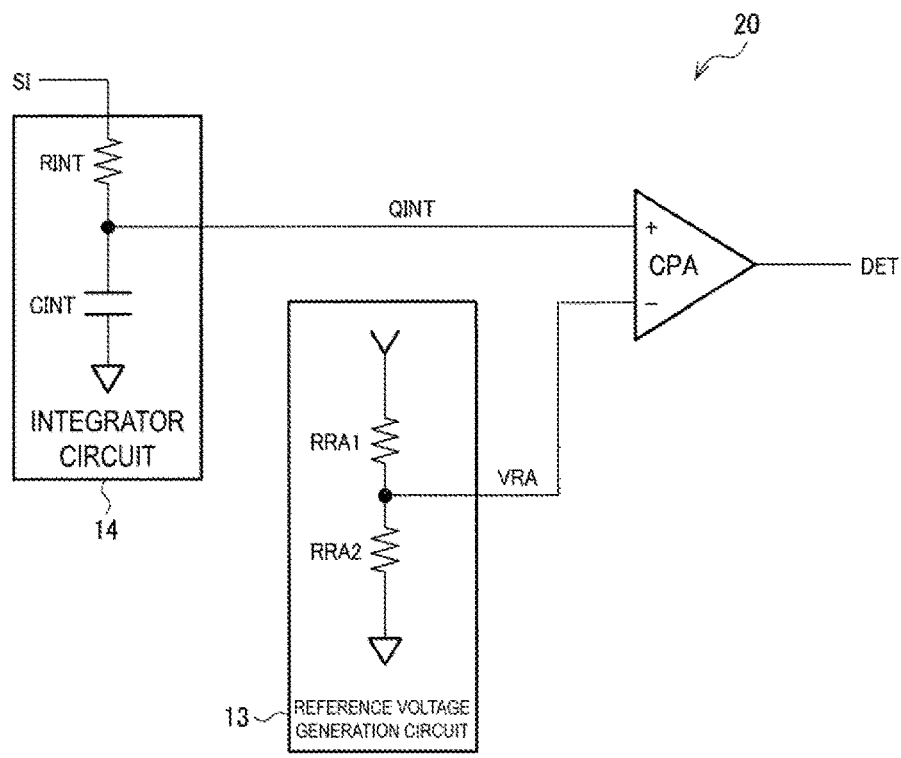
FIG. 8 is a first detailed configuration example of a detection circuit.

FIG. 8 is a first detailed configuration example of the detection circuit 20. The detection circuit 20 includes an integrator circuit 14, a comparator circuit CPA, and a reference voltage generation circuit 13.

The integrator circuit 14 integrates the output signal SI of the receiving circuit 10 and outputs the result as an output voltage QINT. The integrator circuit 14 includes a resistor RINT and a capacitor CINT. The output signal SI is input to one end of the resistor RINT, and the other end of the resistor RINT is connected to one end of the capacitor CINT. The other end of the capacitor CINT is connected to the ground node. The output voltage QINT is output from the other end of the resistor RINT.

The reference voltage generation circuit 13 generates a reference voltage VRA. The reference voltage generation circuit 13 includes resistors RRA1 and RRA2. One end of the resistor RRA1 is connected to the power source node, and the other end of the resistor RRA1 is connected to one end of the resistor RRA2. The other end of the resistor RRA2 is connected to the ground node. The reference voltage VRA is output from the other end of the resistor RRA1.

The comparator circuit CPA outputs the detection signal DET by comparing the output voltage QINT of the integrator circuit 14 with the reference voltage VRA. When the duty cycle of the output signal SI output from the receiving circuit 10 is greater than 50%, the comparator circuit CPA outputs the detection signal DET of a first voltage level. On the other hand, when the duty cycle of the output signal SI is less than 50%, the comparator CPA outputs the detection signal DET of a second voltage level. For example, as illustrated in FIG. 8, the output voltage QINT is input to a positive input terminal of the comparator circuit CPA, and the reference voltage VRA is input to a negative input terminal of the comparator circuit CPA. In this case, DET is at a high level when QINT>VRA, and DET is at a low level when QINT<VRA. In other words, in this example, the first voltage level is the high level and the second voltage level is the low level.

Operations of the setting circuit 40 will be described in a case in which the detection circuit 20 illustrated in FIG. 8 is applied to the second configuration example illustrated in FIG. 5. Note that the detection circuit 20 illustrated in FIG.

8 can also be applied to the first configuration example illustrated in FIG. 3 and the third configuration example illustrated in FIG. 6.

The setting circuit 40 sets the capacitance values cp and cm of the capacitor circuits CP and CM based on the detection signal DET. Specifically, when the detection signal DET is at the first voltage level, the setting circuit 40 increases the capacitance value cp while decreasing the capacitance value cm. On the other hand, when the detection signal DET is at the second voltage level, the setting circuit 40 decreases the capacitance value cp while increasing the capacitance value cm.

In this way, when the duty cycle of the output signal SI is greater than 50%, the setting circuit 40 increases the capacitance value cp while decreasing the capacitance value cm. In this way, the duty cycle of the output signal SI decreases. On the other hand, when the duty cycle of the output signal SI is less than 50%, the setting circuit 40 decreases the capacitance value cp while increasing the capacitance value cm. In this way, the duty cycle of the output signal SI increases. In this way, it is possible to cause the duty cycle of the output signal SI to be 50%.

Figure 9:
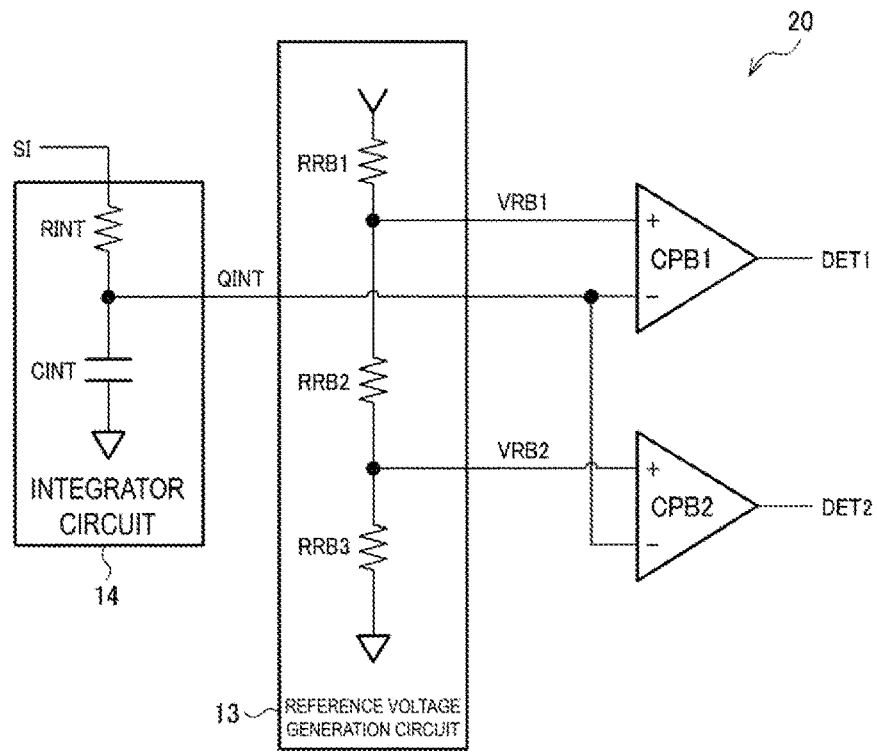
FIG. 9 is a second detailed configuration example of the detection circuit.

FIG. 9 is a second detailed configuration example of the detection circuit 20. The detection circuit 20 includes the integrator circuit 14, a comparator circuit CPB1, and the reference voltage generation circuit 13. Note that the same components as the components already described are assigned the same reference numerals, and a description of the components will be omitted as appropriate.

The reference voltage generation circuit 13 generates a reference voltage VRB1 that is a first reference voltage and a reference voltage VRB2 that is a second reference voltage. VRB1>VRB2. When the predetermined range of the duty is $(50-\alpha)\%$ or greater to $(50+\alpha)\%$ or less, VRB1 corresponds to an upper limit $(50+\alpha)\%$ of the predetermined range, and VRB2 corresponds to a lower limit $(50-\alpha)\%$ of the predetermined range. The reference voltage generation circuit 13 includes resistors RRB1 to RRB3. One end of the resistor RRB1 is connected to the power source node, and the other end of the resistor RRB1 is connected to one end of the resistor RRB2. The other end of the resistor RRB2 is connected to one end of the resistor RRB3 and the other end of the resistor RRB2 is connected to one end of the resistor RRB3. The other end of the resistor RRB3 is connected to the ground node. The reference voltage VRB1 is output from the other end of the resistor RRB1, and the reference voltage VRB2 is output from the other end of the resistor RRB2.

The comparator circuit CPB1 outputs a detection signal DET1, which is a first detection signal, by comparing the output voltage QINT of the integrator circuit 14 with the reference voltage VRB1. When the duty cycle of the output signal SI output from the receiving circuit 10 is greater than $(50+\alpha)\%$, the comparator circuit CPB1 outputs the detection signal DET1 of a first voltage level. On the other hand, when the duty cycle of the output signal SI is less than $(50+\alpha)\%$, the comparator circuit CPB1 outputs the detection signal DET1 of a second voltage level. For example, as illustrated in FIG. 9, the output voltage QINT is input to a positive input terminal of the comparator circuit CPB1, and the reference voltage VRB1 is input to a negative input terminal of the comparator circuit CPB1. In this case, DET1 is at a high level when QINT>VRB1, and DET1 is at a low level when QINT<VRB1.

The comparator circuit CPB2 outputs a detection signal DET2, which is a second detection signal, by comparing the output voltage QINT of the integrator circuit 14 with the reference voltage VRB2. When the duty cycle of the output signal SI output from the receiving circuit 10 is greater than $(50-\alpha)\%$, the comparator circuit CPB2 outputs the detection signal DET2 of a first voltage level. On the other hand, when the duty of the output signal SI is less than $(50-\alpha)\%$, the comparator circuit CPB2 outputs the detection signal DET2 of a second voltage level. For example, as illustrated in FIG. 9, the output voltage QINT is input to a positive input terminal of the comparator circuit CPB2, and the reference voltage VRB2 is input to a negative input terminal of the comparator circuit CPB2. In this case, DET2 is at the high level when QINT>VRB2, and DET2 is at the low level when QINT<VRB2.

Operations of the setting circuit 40 will be described in a case in which the detection circuit 20 illustrated in FIG. 9 is applied to the second configuration example illustrated in FIG. 5. Here, the detection signals DET1 and DET2 illustrated in FIG. 9 correspond to the detection signal DET illustrated in FIG. 5. Note that the detection circuit 20 illustrated in FIG. 9 can also be applied to the first configuration example illustrated in FIG. 3 and to the third configuration example illustrated in FIG. 6.

The setting circuit 40 sets the capacitance values cp and cm of the capacitor circuits CP and CM based on the detection signals DET1 and DET2. Specifically, when the detection signals DET1 and DET2 are at the first voltage level, the setting circuit 40 increases the capacitance value cp while decreasing the capacitance value cm. On the other hand, when the detection signals DET1 and DET2 are at the second voltage level, the setting circuit 40 decreases the capacitance value cp while increasing the capacitance value cm. When the detection signal DET1 is at the second voltage level and the detection signal DET2 is at the first voltage level, the setting circuit 40 does not change the capacitance values cp and cm.

In this way, when the duty cycle of the output signal SI is greater than $(50+\alpha)\%$, the setting circuit 40 increases the capacitance value cp while decreasing the capacitance value cm. In this way, the duty cycle of the output signal SI decreases. On the other hand, when the duty of the output signal SI is less than $(50-\alpha)\%$, the setting circuit 40 decreases the capacitance value cp while increasing the capacitance value cm. In this way, the duty cycle of the output signal SI increases. When the duty cycle of the output signal SI is greater than $(50-\alpha)\%$ and less than $(50+\alpha)\%$, the setting circuit 40 does not change the capacitance values cp and cm. Accordingly, the duty cycle of the output signal SI does not change. In this way, the duty cycle of the output signal SI can be caused to be within the predetermined range of $(50-\alpha)\%$ or greater to $(50+\alpha)\%$ or less.

5. Transmission Circuit, Receiving Circuit

Figure 10:
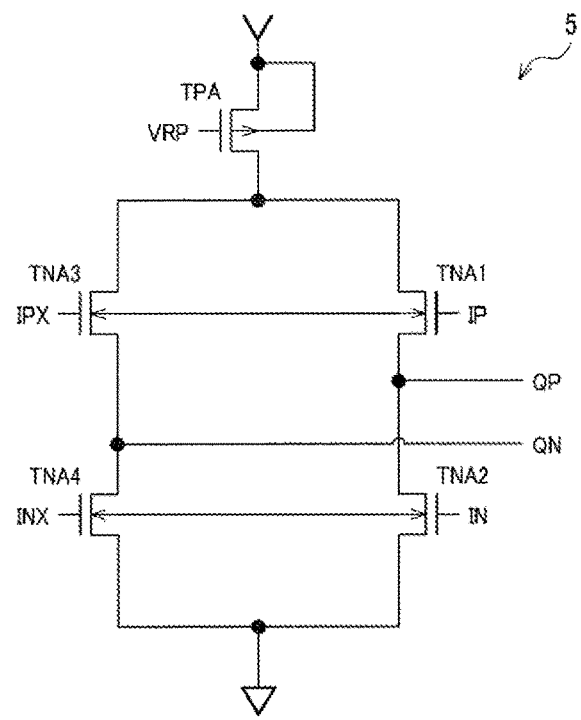
FIG. 10 is a detailed configuration example of a transmission circuit.

FIG. 10 is a detailed configuration of the transmission circuit 5. The transmission circuit 5 includes a P-type transistor TPA and N-type transistors TNA1 to TNA4.

The N-type transistors TNA1 to TNA4 configure an H-bridge circuit, and the H-bridge circuit is driven by signals IP, IN, IPX, and INX. The signal IPX is a logical inversion signal of the signal IP and signal INX is a logical inversion signal of the signal IN. A bias voltage VRP is input to a gate of the P-type transistor TPA, and the P-type transistor TPA functions as a current source. This current source supplies a constant current to the H-bridge circuit.

Hereinafter, a high level is denoted by H, and a low level is denoted by L. When IP=H and IN=L, the N-type transistors TNA1 and TNA4 are on and the N-type transistors TNA2 and TNA3 are off. Current flows from the current source through the N-type transistor TNA1 to an output node QP. This current returns to an output node QN via a termination resistor of a receiving circuit and flows through the N-type transistor TNA4 to the ground node. When IP=L and IN=H, the N-type transistors TNA1 and TNA4 are off and the N-type transistors TNA2 and TNA3 are on. Current flows from the current source through the N-type transistor TNA3 to the output node QN. This current returns to the output node QP via the termination resistor of the receiving circuit and flows through the N-type transistor TNA2 to the ground node. In this way, the transmission circuit 5 outputs differential signals using current driving.

Figure 11:
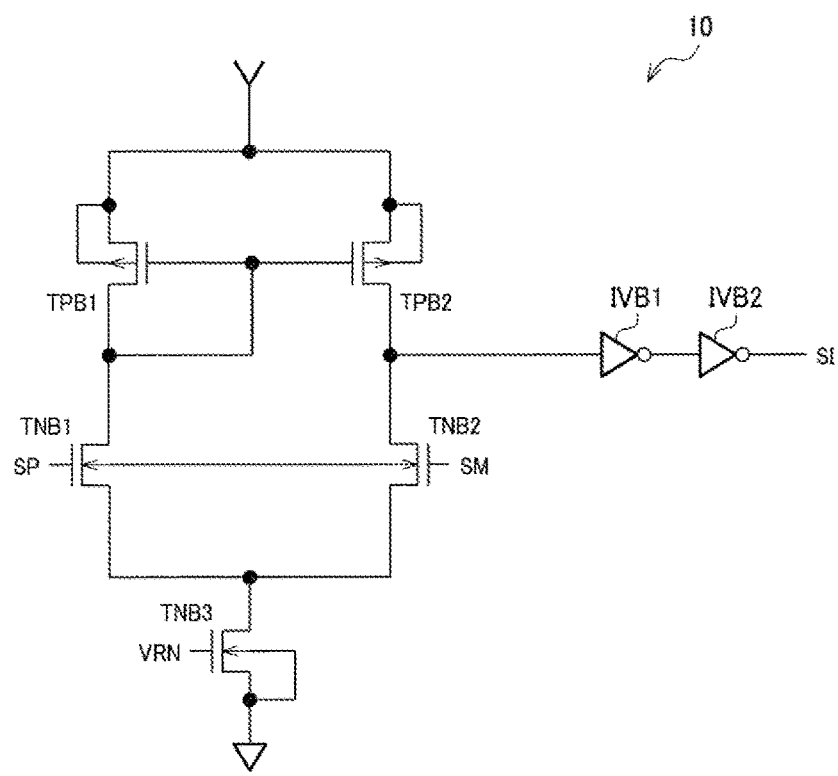
FIG. 11 is a detailed configuration example of a receiving circuit.

FIG. 11 is a detailed configuration example of the receiving circuit 10. The receiving circuit 10 includes P-type transistors TPB1 and TPB2, N-type transistors TNB1 to TNA3, and logical inversion circuits IVB1 and IVB2.

The P-type transistors TPB1 and TPB2 and the N-type transistors TNB1 and TNB2 configure a differential pair circuit, and the differential pair circuit amplifies the signals SP and SM. The signals SP and SM are the differential signals input to the receiving circuit 10. A bias voltage VRN is input to a gate of the N-type transistor TNB3, and the N-type transistor TNB3 functions as a current source. The current source supplies a constant current to the differential pair circuit. The logical inversion circuits IVB1 and IVB2 output the output signal SI by buffering an output signal of the differential pair circuit. In this way, the receiving circuit 10 outputs the received differential signals as the single-ended output signal SI.

For example, it is assumed that the cross point of the differential signals input to the receiving circuit 10 is not displaced. However, if there is an imbalance in the differential pair circuit, the duty cycle of the output signal SI is displaced. Alternatively, if there is an imbalance between the capacity of the logical inversion circuits IVB1 and IVB2 to change the signal from the low level to the high level and the capacity of the logical inversion circuits IVB1 and IVB2 to change the signal from the high level to the low level, the duty cycle of the output signal SI is displaced. The circuit device 100 of the present embodiment can cause the duty cycle of the output signal SI to be 50% even when there is such an imbalance.

6. Embedded Clock Serializer/Deserializer (SerDes)

The circuit device 100 of the present embodiment described above can be applied to an embedded clock Serializer/Deserializer. An embedded clock Serializer/Deserializer is a method to transfer data signals and clock signals using a set of differential signals, by embedding a clock signal in the data signal. Herinafter, the Serializer/Deserializer is simply referred to as a SerDes. Note that the circuit device 100 of the present embodiment can also be applied to a method in which the data signal and the clock signal described with reference to FIG. 1 and the like are respectively transferred as the differential signals.

Figure 12:
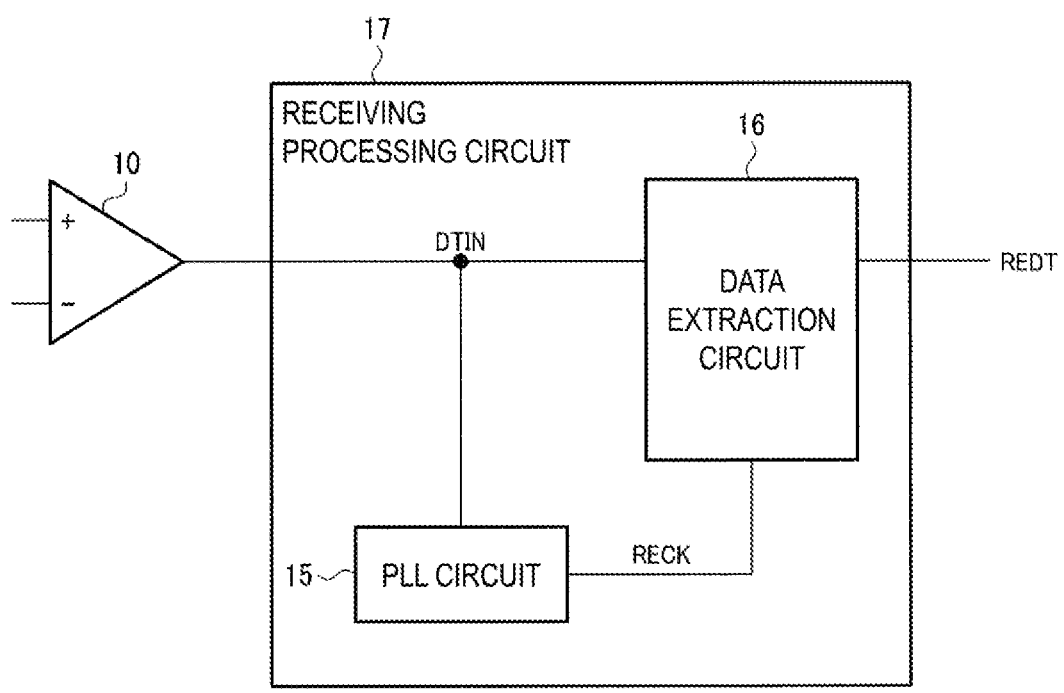
FIG. 12 is a configuration example of a receiving processing circuit in a SerDes.

FIG. 12 is a configuration example of a receiving processing circuit 17 in the SerDes. The receiving processing circuit 17 includes a PLL circuit 15 and a data extraction circuit 16. Note that the circuit device 100 illustrated in FIG. 3, FIG. 5, and FIG. 6 can include the receiving processing circuit 17 illustrated in FIG. 12.

The receiving circuit 10 receives the SerDes standard differential signals and outputs the received signals as an output signal DTIN. The output signal DTIN corresponds to the output signal SI illustrated in FIG. 3, FIG. 5, and FIG. 6. The PLL circuit 15 generates a clock signal RECK that is synchronized with a clock signal included in the output signal DTIN. The data extraction circuit 16 extracts a data signal from the output signal DTIN based on the clock signal RECK. This data signal is encoded using 8b10b encoding, for example. The data extraction circuit 16 performs 8b10b decoding on the extracted data signal to recover a pre-encoded data signal REDT.

Figure 13:
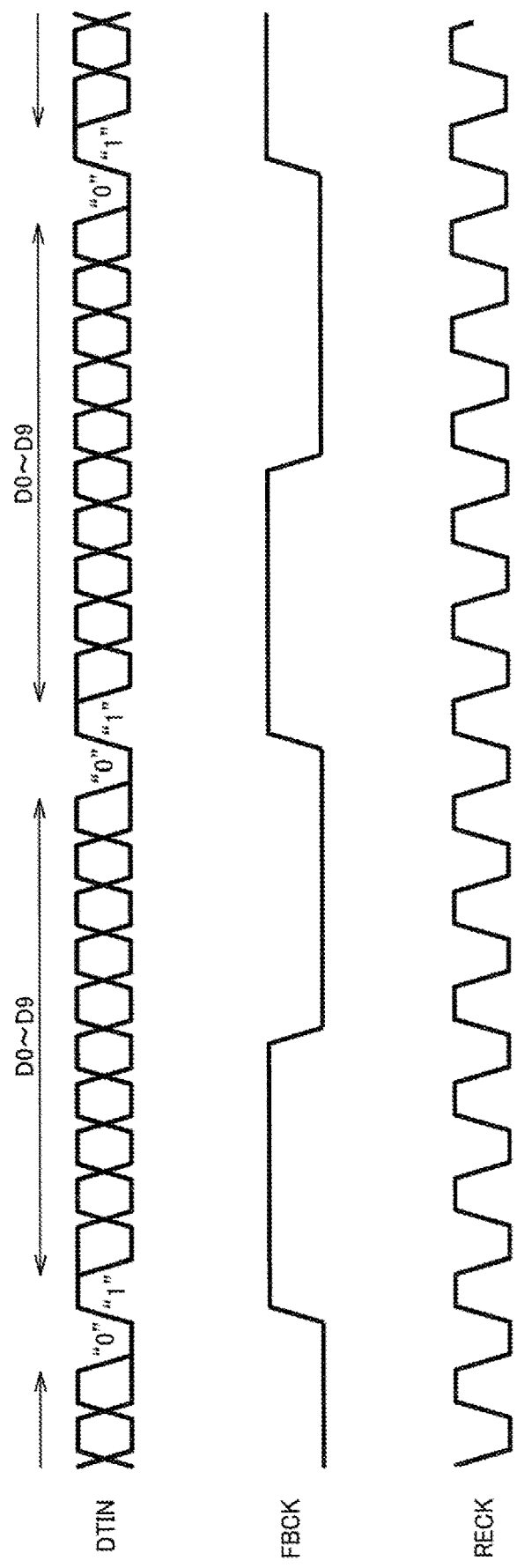
FIG. 13 is a waveform diagram illustrating an operation of the receiving processing circuit.

FIG. 13 is a waveform diagram illustrating operations of the receiving processing circuit 17. The output signal DTIN includes 10 bit data D0 to D9 encoded using 8b10b encoding, and the clock signal. A bit "0" follows the 10 bit data D0 to D9, and this is followed by a bit "1", which is followed by the 10 bit data D0 to D9. This transition from "0" to "1" is the clock signal embedded in the data.

The PLL circuit 15 performs a phase comparison of a feedback clock signal FBCK that has divided a VCO oscillation signal, with the "0" to "1" transition in the output signal DTIN. Based on the phase comparison result, the PLL circuit 15 locks the VCO oscillation signal to the "0" to "1" transition in the output signal DTIN. The PLL circuit 15 outputs the clock signal RECK based on the VCO oscillation signal.

The data extraction circuit 16 captures the 10 bit data D0 to D9 included in the output signal DTIN based on the clock signal RECK. At this time, when the data determination time of the output signal DTIN fluctuates due to the displacement of the cross point, it becomes difficult to secure the set up and hold times when capturing the 10 bit data D0 to D9 based on the clock signal RECK. For example, in a case where the high duty cycle of the output signal DTIN is less than 50%, the time at which the output signal DTIN is determined at the high level is short, and therefore, the set up and hold times when capturing the high level based on the clock signal RECK are more difficult to secure. The circuit device 100 of the present embodiment can cause the duty cycle of the output signal DTIN to be 50%, and thus can improve the set-up and hold times.

Electro-Optical Device

Next, a configuration example of an electro-optical device 250 using the circuit device 10 according to the present embodiment will be described herein. The electro-optical device 250 illustrated in FIG. 14 includes the circuit device 100 that is the display driver, and an electro-optical panel 200. The circuit device 100 that is the display driver drives the electro-optical panel 200 based on the data signals received by the receiving circuit 10.

The circuit device 100 includes an interface circuit 12, a drive circuit 120, a D/A converter circuit 130, a gradation voltage generation circuit 132, a display data register 134, and a processing circuit 140.

The interface circuit 12 includes the receiving circuit 10. Differential signals are input from a transmission circuit of an external device to the interface circuit 12 via the terminals TP and TM. The external device is, for example, a processor, such as a CPU or a microcomputer, or is a display controller. The interface circuit 12 includes the detection circuit 20, the setting circuit 40, the interface circuit 50, the capacitor circuits CP and CM, and the termination resistor RT illustrated in FIG. 3. Alternatively, the interface circuit 12 includes the detection circuit 20, the setting circuit 40, the capacitor circuits CP and CM, and the terminating resistor RT illustrated in FIG. 5. Alternatively, the interface circuit 12 includes the detection circuit 20, the setting circuit 40, the interface circuit 50, the resistance circuits RP1 RP2, RM1, and RM2, and the termination resistors RTP and RTM illustrated in FIG. 6.

The processing circuit 140 performs various types of control processing. For example, the processing circuit 140 performs display timing control, control of each circuit in the circuit device 100, interface processing with an external device, and the like. The processing circuit 140 can be realized with automatic arrangement wiring, such as a gate array. A data signal received by the receiving circuit 10 is input to the processing circuit 140. The processing circuit 140 outputs display data based on the data signal.

The display data register 134 is configured to latch the display data from the processing circuit 140. The gradation voltage generation circuit 132, which is a gamma voltage circuit, outputs a plurality of gradation voltages to the D/A converter circuit 130. The D/A converter circuit 130 includes a plurality of D/A converters DAC1 to DACn. The D/A converter circuit 130 selects, from among the plurality of gradation voltages from the gradation voltage generation circuit 132, a gradation voltage corresponding to the display data sent from the display data register 134, and to output the selected gradation voltage to the drive circuit 120. The drive circuit 120 is configured to output the selected gradation voltage to each of the data lines as a data voltage.

The drive circuit 120 drives the electro-optical panel 2000 by outputting data voltages VD1 to VDn corresponding to the display data to data lines DL1 to DLn. n is an integer equal to or greater than 2. The drive circuit 120 includes a plurality of amplifier circuits AM1 to AMn. The amplifier circuits AM1 to AMn output the data voltages VD1 to VDn to the data lines DL1 to DLn, by buffering or amplifying the gradation voltages from the D/A converters DAC1 to DACn.

The electro-optical panel 200 is a panel for displaying images, and can be realized by a liquid crystal panel or an organic electro-luminescence (EL) panel, for example. An active-matrix panel using switching elements such as thin film transistors (TFTs) can be employed as the liquid crystal panel.

5. Electronic Apparatus, Projector

Figure 15:
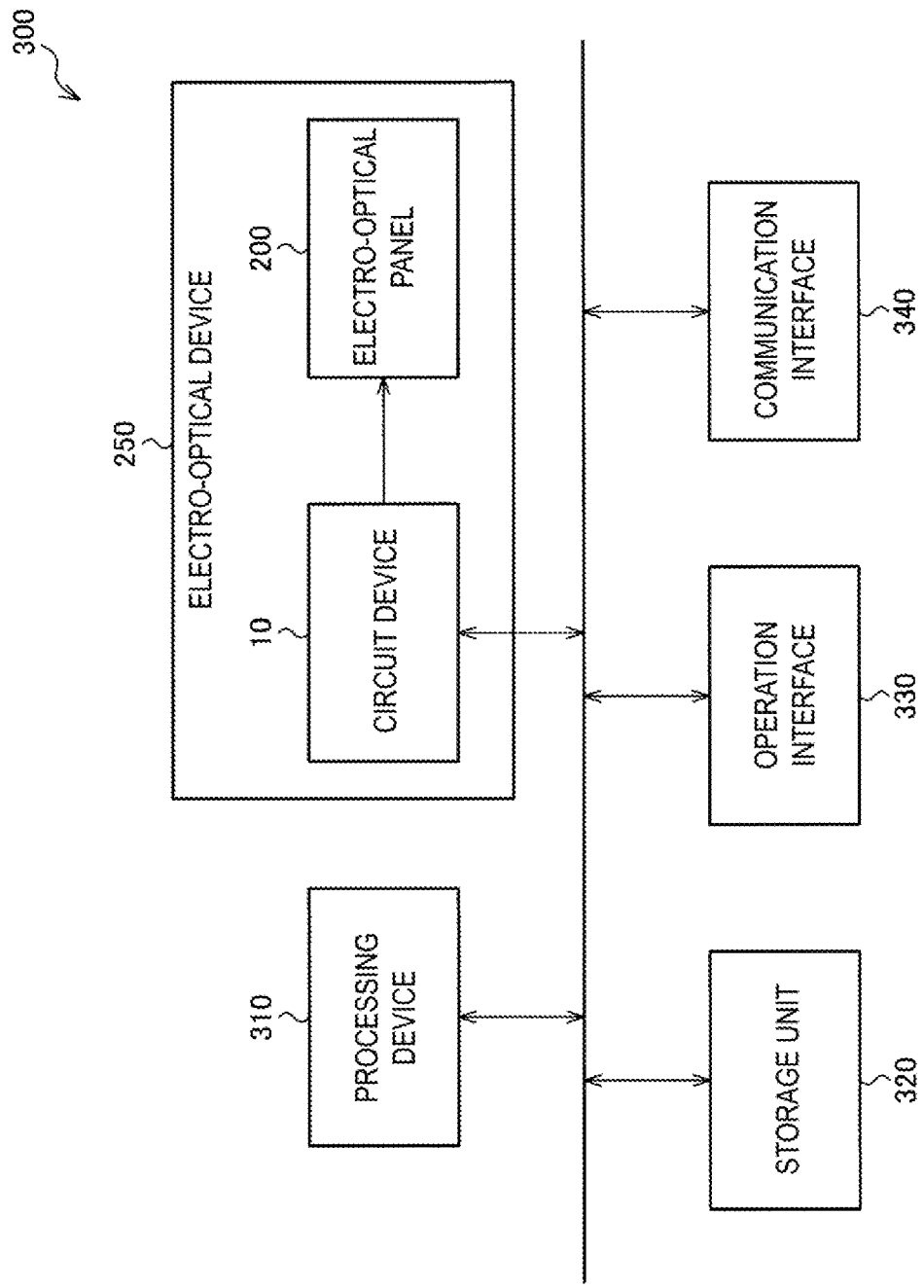
FIG. 15 is a configuration example of an electronic apparatus.

FIG. 15 illustrates a configuration example of an electronic apparatus 300 including the circuit device 100 according to the present embodiment. The electronic apparatus 300 includes the circuit device 100 according to the present embodiment, the electro-optical panel 200, a processing device 310, a storage unit 320, an operation interface 330, and a communication interface 340. The electro-optical device 250 is configured by the circuit device 100 that is the display driver and the electro-optical panel 200. Specific examples of the electronic apparatus 300 include various electronic devices, such as projectors, head-mounted displays, mobile information terminals, vehicle-mounted devices including meter panels and car navigation systems, mobile game consoles, robots, and information processing devices.

The processing device 310 carries out control processing for the electronic device 300 and various types of signal processing. The processing device 310 can be realized by, for example, a processor such as a CPU or an MPU, an ASIC, or the like. Alternatively, the processing device 310 may be a display controller. The storage unit 320 stores data from the operation interface 330 and the communication interface 340, for example, or functions as a work memory for the processing device 310, for example. The storage unit 320 can be realized by, for example, a semiconductor memory such as a random access memory (RAM) or a read-only memory (ROM), a magnetic storage device such as a hard-disc drive (HDD), an optical storage device such as a compact disc (CD) drive or a digital versatile disc (DVD) drive, or the like. The operation interface 330 is a user interface for receiving various operations from a user. For example, the operation interface 330 can be realized by buttons, a mouse, a keyboard, a touch panel installed in the electro-optical panel 200, or the like. The communication interface 340 is an interface for performing communication of the display data and control data. Communication processing carried out by the communication interface 340 may be wired communication processing or wireless communication processing.

The display data received by the communication interface 340 or the display data read from the storage unit 320 are input to the processing device 310. The processing device 310 transfers the display data to the circuit device 100. The circuit device 100 drives the electro-optical panel 200 based on the input display data, and thus causes the electro-optical panel 200 to display an image corresponding to the display data.

When the electronic apparatus 300 is a projector, a projection unit including a light source and an optical system is further provided. The light source is realized by a lamp unit including a white light source such as a halogen lamp, for example. The optical system is realized by lenses, prisms, mirrors, or the like. When the electro-optical panel 200 is a transmissive type, the light from the light source is incident on the electro-optical panel 200 via the optical system and the like, and the light transmitted by the electro-optical panel 200 is projected onto a screen. When the electro-optical panel 200 is a reflective type, the light from the light source is incident on the electro-optical panel 200 via the optical system and the like, and the light reflected by the electro-optical panel 200 is projected onto a screen.

The circuit device of the present embodiment described above includes the first terminal into which the first signal of the differential signals is input, the second terminal into which the second signal of the differential signals is input, and the receiving circuit configured to receive the differential signals via the first terminal and the second terminal. The circuit device also includes the first signal line, the second signal line, the first capacitor circuit, the second capacitor circuit, and the detection circuit. The first signal line connects the first input terminal of the receiving circuit and the first terminal. The second signal line connects the second input terminal of the receiving circuit and the second terminal. One end of the first capacitor circuit is connected to the first signal line and the other end of the first capacitor circuit is connected to the node with the predetermined potential. One end of the second capacitor circuit is connected to the second signal line, and the other end of the second capacitor circuit is connected to the node with the predetermined potential. The detection circuit detects the duty cycle of the output signal output from the receiving circuit. The first capacitance value, which is the capacitance value of the first capacitor circuit, is set to the capacitance value based on the detection result of the detection circuit.

When the capacitance value of the first capacitor circuit is changed, the cross point of the differential signals changes, and thus the duty cycle of the output signal output from the receiving circuit changes. In other words, according to the present embodiment, the capacitance value of the first capacitor circuit is set to the capacitance value based on the detection result of the duty cycle, making it possible to reduce the displacement of the duty cycle with respect to the reference duty cycle.

Further, in the present embodiment, the circuit device may include the memory that stores the setting information of the first capacitance value, and the setting circuit that sets the first capacitance value based on the setting information read out from the memory.

In this way, the setting information of the first capacitance value based on the detection result of the detection circuit can be stored in the memory. Then, the first capacitance value is set to the capacitance value based on the detection result of the detection circuit, by the first capacitance value being set by the setting circuit based on the setting information read out from the memory.

Further, in the present embodiment, the memory may be the nonvolatile memory.

In this way, the setting information of the first capacitance value based on the detection result of the detection circuit can be stored in the nonvolatile memory. For example, the setting information can be written into the nonvolatile memory during the manufacturing of the circuit device or the like.

Further, in the present embodiment, the circuit device may include the setting circuit that sets the first capacitance value based on the detection result.

In this way, the first capacitance value is set to the capacitance value based on the detection result of the detection circuit, by the first capacitance value being set by the setting circuit based on the detection result of the detection circuit. Further, in this way, the setting circuit can set the first capacitance value during normal operation of the circuit device.

Further, in the present embodiment, the detection circuit may include the integrator circuit that integrates the output signal of the receiving circuit, and the comparator circuit that outputs the detection signal by comparing the output voltage of the integrator circuit with the reference voltage. The setting circuit may set the first capacitance value based on the detection signal.

In this way, the output voltage of the integrator circuit becomes the smoothed voltage of the output signal of the receiving circuit. Specifically, the output voltage of the integrator circuit changes depending on the duty cycle of the output signal output from the receiving circuit. Thus, the comparator circuit can detect the duty cycle of the output signal by comparing the output voltage of the integrator circuit with the reference voltage. Specifically, the comparator circuit can determine whether the duty cycle of the output signal is higher than the reference duty cycle. The reference duty cycle is the duty cycle corresponding to the reference voltage.

Further, in the present embodiment, the comparator circuit may output the detection signal at the first voltage level or the second voltage level depending on the comparison result of the output voltage of the integrator circuit with the reference voltage. The setting circuit may increase the first capacitance value when the detection signal is at the first voltage level and decrease the first capacitance value when the detection signal is at the second voltage level.

In this way, the first capacitance value is controlled depending on whether the duty cycle of the output signal output from the receiving circuit is higher than the reference duty cycle. This allows for a reduction in the displacement of the duty cycle relative to the reference duty cycle.

Also in this embodiment, the detection circuit may include the integrator circuit that integrates the output signal of the receiving circuit, the first comparator circuit that outputs the first detection signal by comparing the output voltage of the integrator circuit with the first reference voltage, and the second comparator circuit that outputs the second detection signal by comparing the output voltage of the integrator circuit with the second reference voltage that is different from the first reference voltage. The setting circuit may set the first capacitance value based on the first detection signal and the second detection signal.

In this way, the first comparator circuit can determine whether the duty cycle of the output signal is higher than the first reference duty cycle by the first comparator circuit comparing the output voltage of the integrator circuit with the first reference voltage. The first reference duty cycle is the duty cycle corresponding to the first reference voltage. The second comparator circuit can determine if the duty cycle of the output signal is higher than the second reference duty cycle by comparing the output voltage of the integrator circuit with the second reference voltage. The second reference duty cycle is the duty cycle corresponding to the second reference voltage. By setting the first capacitance value based on the first detection signal and the second detection signal, the setting circuit can set the first capacitance value such that the duty cycle of the output signal is between the first reference duty cycle and the second reference duty cycle.

Further, in the present embodiment, the circuit device may include the plurality of capacitors. The setting circuit may control the first capacitance value in at least one of the vertical blanking period and the horizontal blanking period during the display data transfer.

In this way, the first capacitance value can be controlled in at least one of the vertical blanking period and the horizontal blanking period in which the display data is not input to the receiving circuit. For example, the differential signal for duty cycle detection is input to the receiving circuit in at least one of the vertical blanking period and the horizontal blanking period. The first capacitance value is controlled based on the differential signal for the duty cycle detection. This type of the differential signal for duty cycle detection may be input to the receiving circuit in the blanking period in which no display data is input to the receiving circuit.

Further, in the present embodiment, the first capacitance value may be the capacitance value that causes the duty cycle to be 50%.

In this way, the reference duty cycle described above is 50%, and the first capacitance value is set so that the duty cycle of the output signal output from the receiving circuit is 50%. Setting the duty cycle to 50% makes it easier to secure the setup and hold times.

Further, the second capacitance value, which is the capacitance value of the second capacitor circuit, is set to the capacitance value based on the detection result by the detection circuit.

When the capacitance value of the second capacitor circuit is changed, the cross point of the differential signals changes, and thus the duty cycle of the output signal output from the receiving circuit changes. In other words, according to the present embodiment, the capacitance value of the second capacitor circuit is set to the capacitance value based on the detection result of the duty cycle, making it possible to reduce the displacement of the duty cycle with respect to the reference duty cycle.

Further, in another aspect of the present embodiment, the circuit device includes the first terminal into which the first signal of the differential signals is input, the second terminal into which the second signal of the differential signals is input, and the receiving circuit that receives the differential signals. The circuit device also includes the first signal line, the second signal line, the first resistance circuit, the second resistance circuit, the third resistance circuit, the fourth resistance circuit, and the detection circuit. The first signal line connects the first input terminal of the receiving circuit and the first terminal. The second signal line connects the second input terminal of the receiving circuit and the second terminal. One end of the first resistance circuit is connected to the first signal line and the other end of the first resistance circuit is connected to the node with the first potential. One end of the second resistance circuit is connected to the first signal line, and the other end of the second resistance circuit is connected to the node with the second potential that has a lower potential than the node with the first potential. One end of the third resistance circuit is connected to the second signal line and the other end of the third resistance circuit is connected to the node with the first potential. One end of the fourth resistance circuit is connected to the second signal line and the other end of the fourth resistance circuit is connected to the node with the second potential. The detection circuit detects the duty cycle of the output signal of the receiving circuit. The first resistance value, which is the resistance value of the first resistance circuit, and the second resistance value, which is the resistance value of the second resistance circuit, are set to resistance values based on the detection result of the detection circuit.

When the resistance value of the first resistance circuit and the resistance value of the second resistance circuit are changed, the cross point of the differential signals changes, and thus the duty cycle of the output signal output from the receiving circuit changes. In other words, according to the present embodiment, the resistance value of the first resistance circuit and the resistance value of the second resistance circuit are set to the resistance values based on the detection result of the duty, making it possible to reduce the displacement of the duty cycle with respect to the reference duty cycle.

Further, in the present embodiment, the circuit device may include the memory that stores the setting information for the first resistance value and the second resistance value, and the setting circuit that sets the first resistance value and the second resistance value based on the setting information read out from the memory.

In this way, the setting information for the first resistance value and the second resistance value based on the detection result of the detection circuit can be stored in the memory. Then, by the setting circuit setting the first resistance value and the second resistance value based on the setting information read out from the memory, the first resistance value and the second resistance value are set to the resistance values based on the detection result of the detection circuit.

Further, in the present embodiment, the circuit device may include the setting circuit that sets the first resistance value and the second resistance value based on the detection result.

In this way, by the setting circuit setting the first resistance value and the second resistance value based on the detection result of the detection circuit, the first resistance value and the second resistance value are set to the resistance values based on the detection result of the detection circuit. In this way, the setting circuit can set the first resistance value and the second resistance value during normal operation of the circuit device.

Further, in the present embodiment, the detection circuit may include the integrator circuit that integrates the output signal of the receiving circuit, and the comparator circuit that outputs the detection signal by comparing the output voltage of the integrator circuit with the reference voltage. The setting circuit may set the first resistance value and the second resistance value based on the detection signal.

In this way, the comparator circuit can detect the duty cycle of the output signal by comparing the output voltage of the integrator circuit with the reference voltage.

Specifically, the comparator circuit can determine whether the duty cycle of the output signal is higher than the reference duty cycle. Then, the setting circuit can set the first resistance value and the second resistance value based on the detection result of the duty cycle.

The electro-optical apparatus according to the present embodiment includes the electro-optical panel and the circuit device that is described above and that drives the electro-optical panel.

Further, in the present embodiment, the electronic apparatus may include any one of the above-described circuit devices.

Although the present embodiment has been described in detail above, those skilled in the art will easily understand that many modified examples can be made without substantially departing from novel items and effects of the present disclosure. All such modified examples are thus included in the scope of the disclosure. For example, terms in the descriptions or drawings given even once along with different terms having identical or broader meanings can be replaced with those different terms in all parts of the descriptions or drawings. All combinations of the embodiment and modified examples are also included within the scope of the disclosure. Furthermore, the configurations, operations, and the like of the circuit device, the electro-optical device, the electronic apparatus, and the like are not limited to those described in the embodiment, and various modifications thereof are possible.

What is claimed is:

1. A circuit device comprising:
   a first terminal into which a first signal of a differential signal is input;
   a second terminal into which a second signal of the differential signal is input;
   a receiving circuit configured to receive the differential signals via the first terminal and the second terminal;
   a first signal line connecting a first input terminal of the receiving circuit and the first terminal;
   a second signal line connecting a second input terminal of the receiving circuit and the second terminal;
   a first capacitor circuit having one end connected to the first signal line and another end connected to a node with a predetermined potential;
   a second capacitor circuit having one end connected to the second signal line and another end connected to a node with a predetermined potential;
   a detection circuit configured to detect a duty cycle of an output signal that is output from the receiving circuit, wherein
   a first capacitance value, which is a capacitance value of the first capacitor circuit, is set to a capacitance value that is based on a detection result of the detection circuit;
   a memory configured to store setting information for setting the first capacitance value; and
   a setting circuit configured to set, based on the setting information read out from the memory, the first capacitance value.

2. The circuit device according to claim 1, wherein the memory is a nonvolatile memory.

3. The circuit device according to claim 1, wherein the setting information read out from the memory is based on the detection result.

4. The circuit device according to claim 3, wherein
   the detection circuit includes:
   an integrator circuit configured to integrate the output signal of the receiving circuit; and
   a comparator circuit configured to output a detection signal by comparing an output voltage of the integrator circuit with a reference voltage, and
   the setting circuit sets, based on the detection signal, the first capacitance value.

5. The circuit device according to claim 4, wherein
the comparator circuit outputs the detection signal at one of a first voltage level and a second voltage level, depending on a result of comparison between the output voltage of the integrator circuit and the reference voltage, and
the setting circuit increases the first capacitance value when the detection signal is at the first voltage level and decreases the first capacitance value when the detection signal is at the second voltage level.

6. A circuit device comprising:
a first terminal into which a first signal of a differential signal is input;
a second terminal into which a second signal of the differential signal is input;
a receiving circuit configured to receive the differential signals via the first terminal and the second terminal;
a first signal line connecting a first input terminal of the receiving circuit and the first terminal;
a second signal line connecting a second input terminal of the receiving circuit and the second terminal;
a first capacitor circuit having one end connected to the first signal line and another end connected to a node with a predetermined potential;
a second capacitor circuit having one end connected to the second signal line and another end connected to a node with a predetermined potential;
a detection circuit configured to detect a duty cycle of an output signal that is output from the receiving circuit, wherein
a first capacitance value, which is a capacitance value of the first capacitor circuit, is set to a capacitance value that is based on a detection result of the detection circuit; and
a setting circuit configured to set the first capacitance value, based on the detection result, wherein
the detection circuit includes:
an integrator circuit configured to integrate the output signal of the receiving circuit;
a first comparator circuit configured to output a first detection signal by comparing an output voltage of the integrator circuit with a first reference voltage; and
a second comparator circuit configured to output a second detection signal by comparing the output voltage of the integrator circuit with a second reference voltage different from the first reference voltage, and
the setting circuit sets, based on the first detection signal and the second detection signal, the first capacitance value.

7. The circuit device according to claim 3, further comprising:
a drive circuit configured to drive an electro-optical panel, wherein
the setting circuit controls the first capacitance value in at least one of a vertical blanking period and a horizontal blanking period during display data transfer.

8. The circuit device according to claim 1, wherein the first capacitance value is a capacitance value at which the duty cycle becomes 50%.

9. The circuit device according to claim 1, wherein a second capacitance value, which is a capacitance value of the second capacitor circuit, is set to a capacitance value that is based on the detection result by the detection circuit.

10. A circuit device comprising:
a first terminal into which a first signal of a differential signal is input;
a second terminal into which a second signal of the differential signal is input;
a receiving circuit configured to receive the differential signals via the first terminal and the second terminal;
a first signal line connecting a first input terminal of the receiving circuit and the first terminal;
a second signal line connecting a second input terminal of the receiving circuit and the second terminal;
a first resistance circuit having one end connected to the first signal line and another end connected to a node with a first potential;
a second resistance circuit having one end connected to the first signal line and another end connected to a node with a second potential having a lower potential than that of the node with the first potential;
a third resistance circuit having one end connected to the second signal line and another end connected to a node with the first potential;
a fourth resistance circuit having one end connected to the second signal line and another end connected to a node with the second potential; and
a detection circuit configured to detect a duty cycle of an output signal of the receiving circuit, wherein
a first resistance value, which is a resistance value of the first resistance circuit, and a second resistance value, which is a resistance value of the second resistance circuit, are set to resistance values that are based on a detection result of the detection circuit.

11. The circuit device according to claim 10, further comprising:
a memory configured to store setting information for setting the first resistance value and the second resistance value; and
a setting circuit configured to set, based on the setting information read out from the memory, the first resistance value and the second resistance value.

12. The circuit device according to claim 10, further comprising:
a setting circuit configured to set the first resistance value and the second resistance value, based on the detection result.

13. The circuit device according to claim 12, wherein
the detection circuit includes:
an integrator circuit configured to integrate the output signal of the receiving circuit; and
a comparator circuit configured to output a detection signal by comparing an output voltage of the integrator circuit with a reference voltage, and
the setting circuit sets, based on the detection signal, the first resistance value and the second resistance value.

14. An electro-optical device comprising:
an electro-optical panel; and
the circuit device that drives the electro-optical panel, the circuit device comprising:
a first terminal into which a first signal of a differential signal is input;
a second terminal into which a second signal of the differential signal is input;
a receiving circuit configured to receive the differential signals via the first terminal and the second terminal;
a first signal line connecting a first input terminal of the receiving circuit and the first terminal;
a second signal line connecting a second input terminal of the receiving circuit and the second terminal;
a first capacitor circuit having one end connected to the first signal line and another end connected to a node with a predetermined potential;

a second capacitor circuit having one end connected to the second signal line and another end connected to a node with a predetermined potential; and a detection circuit configured to detect a duty cycle of an output signal that is output from the receiving circuit, wherein a first capacitance value, which is a capacitance value of the first capacitor circuit, is set to a capacitance value that is based on a detection result of the detection circuit.

15. An electro-optical device comprising:

an electro-optical panel; and the circuit device according to claim 10 that drives the electro-optical panel.

16. An electronic apparatus comprising the circuit device according to claim 1.

17. An electronic apparatus comprising the circuit device according to claim 10.

\* \* \* \* \*